(12) United States Patent
Takahara et al.

(10) Patent No.: US 8,184,374 B2
(45) Date of Patent: May 22, 2012

(54) LENS HAVING PROTECTION FILM AND METHOD FOR MANUFACTURING SUCH LENS

(75) Inventors: Norihisa Takahara, Osaka (JP); Yuka Okada, Hyogo (JP); Akiko Murata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/666,472

(22) PCT Filed: Jul. 14, 2008

(86) PCT No.: PCT/JP2008/001886
§ 371 (c)(1),
(2), (4) Date: Dec. 23, 2009

(87) PCT Pub. No.: WO2009/013872
PCT Pub. Date: Jan. 29, 2009

(65) Prior Publication Data
US 2010/0172025 A1    Jul. 8, 2010

(30) Foreign Application Priority Data

Jul. 23, 2007  (JP) .................................. 2007-191178

(51) Int. Cl.
*G02B 27/10* (2006.01)

(52) U.S. Cl. ....................................................... 359/620

(58) Field of Classification Search .................. 359/576, 359/581, 642, 620, 626
See application file for complete search history.

(56) References Cited

U.S. PATENT DOCUMENTS

| | | | |
|---|---|---|---|
| 4,981,487 A | 1/1991 | da Costa | |
| 6,270,219 B1 | 8/2001 | Saito | |
| 6,373,635 B1 | 4/2002 | Fujimoto et al. | |
| 2002/0115554 A1 | 8/2002 | Zhou | |
| 2003/0044530 A1 | 3/2003 | Morikawa et al. | |
| 2004/0066560 A1* | 4/2004 | Kabeta et al. ................. | 359/642 |
| 2006/0154091 A1 | 7/2006 | Schmidt et al. | |

FOREIGN PATENT DOCUMENTS

| | | |
|---|---|---|
| EP | 1 176 435 | 1/2002 |
| JP | 63-192012 | 8/1988 |
| JP | 2000-352606 | 12/2000 |
| JP | 2001-074914 | 3/2001 |
| JP | 2003-149423 | 5/2003 |
| JP | 2003-154304 | 5/2003 |
| JP | 2004-533629 | 11/2004 |
| JP | 2005-055798 | 3/2005 |
| JP | 3758857 | 1/2006 |
| WO | 98/26707 | 6/1998 |
| WO | 2005/014745 | 2/2005 |

* cited by examiner

*Primary Examiner* — Alicia M Harrington
(74) *Attorney, Agent, or Firm* — Hamre, Schumann, Mueller & Larson, P.C.

(57) ABSTRACT

A second region (12) composed of a plane is formed around a first region (11) having a lens function, and a third region (13) is formed between the first region and the second region. A protection film (24) is formed on the surface of the first region 1. The first region is protruded relative to the second region, the third region is formed throughout the rim of the first region 1, and the surface of the third region is recessed relative to a virtual curved surface (11*a*) that is a curved surface along the surface shape of the first region being extended to the second region. Consequently, it is possible to form throughout the first region a protection film having a surface shape that substantially matches the surface shape of the first region.

7 Claims, 21 Drawing Sheets

LENS HAVING PROTECTION FILM AND METHOD FOR MANUFACTURING SUCH LENS

TECHNICAL FIELD

The present invention relates to a lens having a protection film in which the protection film is formed on the surface of a region having a lens function.

BACKGROUND ART

Conventionally, protection films may be formed on the lens surface of contact lenses, camera lenses, and optical pickup lenses for CD, DVD, etc., for a variety of purposes. Examples of the protection films include an antireflection protection film for preventing light from reflecting off a lens surface, a hard coating protection film for protecting a lens surface from suffering scratches, and a refractive index adjusting protection film for correcting chromatic aberration of a lens substrate. Molding is used as a method for forming such protection films when the shape or the coating condition of a protection film greatly affects the performance of a lens. In molding, a lens substrate is placed in a protection film molding die, a coating to become a protection film is poured into a space between the lens substrate and the protection film molding die, and after the coating is cured, a lens is taken out from the die. Since the shape of the protection film to be formed by the molding is defined by the protection film molding die, it is possible to obtain a protection film having a desired shape and coating.

However, when the molding is used to manufacture a large quantity of protection films, a large number of expensive dies are required. Further, the number of products that can be manufactured per hour also is limited. Thus, the method is not favorable in terms of production cost.

For such problems, pad printing and screen printing have been known as methods for productively forming a protection film on a substrate including a curved surface, such as a lens, at low cost.

A method of pad printing will be described with reference to FIGS. 24A to 24F. First, as shown in FIG. 24A, concave portions patterned on a printing plate 241 in a desired printing pattern are filled with a coating 242. Next, as shown in FIG. 24B, a pad 243 is pressed on the printing plate 241, and as shown in FIG. 24C, the coating 242 is transferred to the pad 243 from the printing plate 241. Thereafter, as shown in FIG. 24D, the pad 243 is moved over an object 244 to be printed. Then, as shown in FIG. 24E, the pad 243 is pressed on the object 244 to be printed to transfer the coating 242 from the pad 243 to the object 244 to be printed, as shown in FIG. 24F. Even when the object 244 to be printed has a bumpy surface shape, by using a flexible pad made of silicone rubber as the pad 243 in this method, the pad 243 can change its shape along the bumpy surface shape, and therefore a favorable printed matter can be obtained.

Patent document 1 discloses a method for forming a protection film on the surface of a lens using pad printing. In Patent document 1, pad printing is used, at the time of manufacturing a colored contact lens, as a method for forming a base layer and a colored layer on the contact lens. That is, after the base layer and the colored layer are pad-printed on a molding surface of an optical part die, the die is filled with a lens material, and by curing the lens material, the colored contact lens is obtained.

Further, Patent document 2 discloses a method for forming a protection film on the surface of a lens using screen printing.

In Patent document 2, screen printing is used as a method for coloring a plastic lens. That is, while rotating a plastic lens, screen printing is carried out on the lens using a squeegee having an edge processed to deform in a curved shape substantially identical to the curved shape of the convex surface of the plastic lens so as to obtain the plastic lens on which a colored layer is formed.

Patent document 1: JP 2004-533629 A
Patent document 2: Japanese Patent 3,758,857 B

DISCLOSURE OF INVENTION

Problem to be Solved by the Invention

However, when pad printing or screen printing is used for a lens including a curved surface portion having a lens function and a planar portion surrounding the curved surface portion, such as a lens used in a digital still camera or a mobile phone with a camera, a pad or a screen that has changed its form during squeezing is less likely to come into contact with the rim of the curved surface portion at the boundary between the plane portion and the curved surface portion. Thus, even if the lens is designed to have an enhanced concentration characteristic by coating the curved surface portion entirely with a protection film having a uniform film thickness so as to substantially match the surface shape of the protection film with the surface shape of the curved surface portion, the surface shape of the protection film becomes faulty due to the protection film not being formed on the rim of the curved surface portion, causing deterioration in the concentration characteristic of the lens.

With the foregoing in mind, it is an object of the present invention to provide a low-cost lens having a protection film, which solves the conventional problems described above and in which a curved surface portion having a lens function is coated entirely with the protection film having a surface shape that substantially matches the surface shape of the curved surface portion. Further, it is an object of the present invention to provide a method for productively manufacturing such a lens having a protection film at low cost.

Means for Solving Problem

The lens having a protection film of the present invention includes: a lens substrate including, at least on one surface, a first region having a lens function, a second region formed around the first region and composed of a plane, and a third region provided between the first region and the second region; and a protection film formed on a surface of the first region. The first region is protruded relative to the second region. The third region is formed throughout a rim of the first region. And a surface of the third region is recessed relative to a virtual curved surface that is a curved surface along a surface shape of the first region being extended to the second region.

The method for manufacturing a lens having a protection film of the present invention includes the steps of preparing a lens substrate including, at least on one surface, a first region having a lens function, a second region formed around the first region and composed of a plane, and a third region provided between the first region and the second region, wherein the first region is protruded relative to the second region, and a surface of the third region is recessed relative to a virtual curved surface that is a curved surface along the surface shape of the first region being extended to the second region, and forming a protection film on a surface of the first region. In the step of forming the protection film, a coating for forming the protection film is applied to the surface of the first region using pad printing or screen printing.

Effects Of The Invention

According to the present invention, the lens substrate includes, at the space between the first region and the second region, the third region having a surface that is recessed relative to the virtual curved surface that is a curved surface along the surface shape of the first region being extended to the second region. Thus, even when the protection film is formed by highly productive and low-cost pad printing or screen printing, it is possible to form, throughout the first region having a lens function, a protection film having a surface shape that substantially matches the surface shape of the first region. Therefore, it is possible to provide a lens having a protection film with a favorable concentration characteristic.

DESCRIPTION OF THE INVENTION

In the present invention, a protection film refers to a film whose surface shape is substantially in line with the surface shape of the first region of the lens substrate and having a thickness of about several μm to several tens of μm.

In the lens having a protection film of the present invention, a diffraction grating may be formed on the surface of the first region. Consequently, by appropriately setting the materials for each of the lens substrate and the protection film and the step height of the diffraction grating, it is possible to obtain a lens with reduced chromatic aberration.

In the lens having a protection film of the present invention, at least one surface may include a plurality of the first regions. Consequently, it is possible to measure the distance to an object by determining a parallax between the plurality of the first regions from an image obtained through the plurality of the first regions.

In the lens having a protection film of the present invention, it is preferable that the surface shape of the first region is rotationally symmetrical with respect to the central axis of the first region. Also, it is preferable that the surface shape of the third region is rotationally symmetrical with respect to the central axis of the first region. Furthermore, it is preferable that the central axis of the first region is perpendicular to the surface of the second region. Consequently, it is possible to form a protection film having favorable rotation symmetry with respect to the central axis of the first region using pad printing or screen printing.

Hereinafter, embodiments of the present invention will be described with reference to the drawings.

Embodiment 1

Figure 1A:
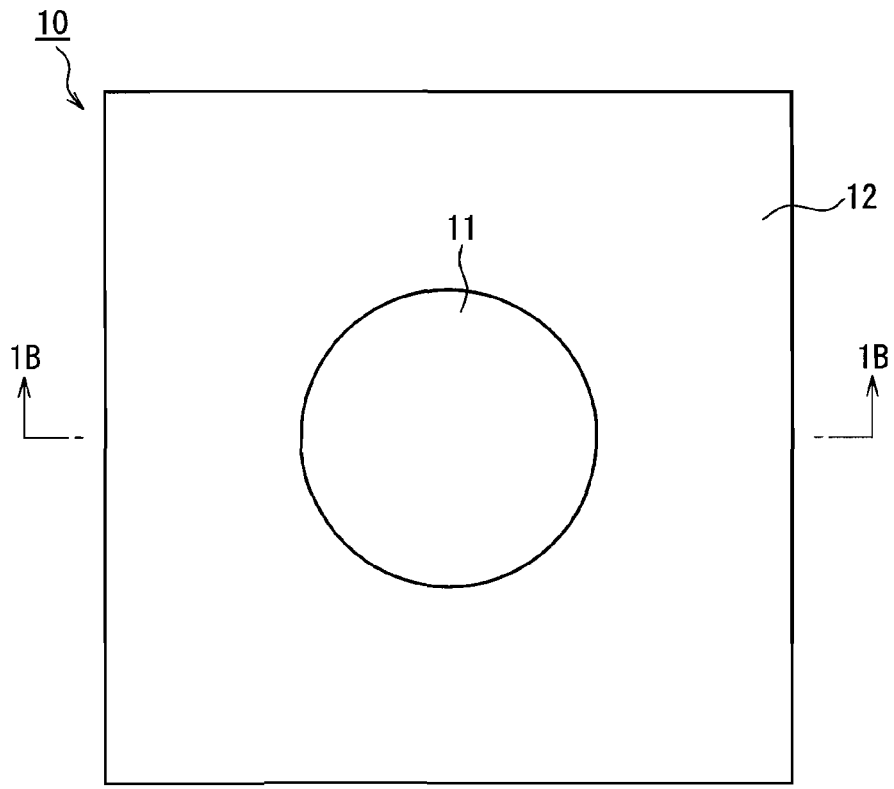
FIG. 1A is a top view of a lens substrate according to Embodiment 1 of the present invention.
Figure 1B:
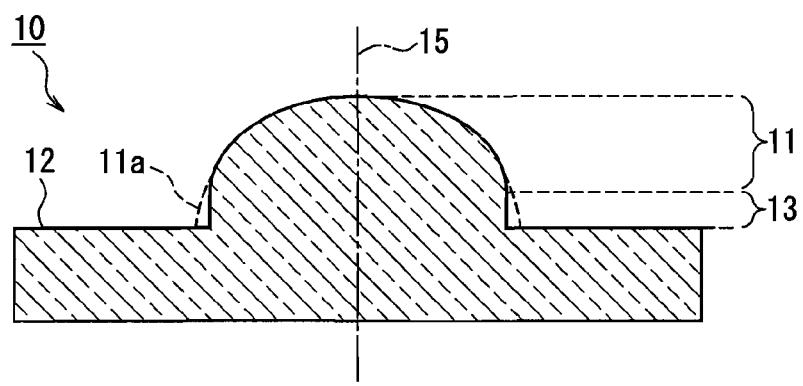
FIG. 1B is a sectional view taken along the line 1B-1B in FIG. 1A.

FIG. 1A is a top view of a lens substrate according to Embodiment 1 of the present invention, and FIG. 1B is a sectional view taken along the line 1B-1B in FIG. 1A. A lens substrate 10 in Embodiment 1 of the present invention includes, on one surface, a first region 11 having a lens function, a planar second region 12 formed around the first region 11, and a third region 13 provided between the first region 11 and the second region 12. The first region 11 is protruded relative to the second region 12 and has a predetermined aspheric surface. Consequently, the first region 11 exerts a lens function utilizing refraction. The surface shape of the first region 11 is rotationally symmetrical with respect to a central axis 15 of the first region 11. In FIG. 1B, a dashed line 11a indicates a virtual curved surface that is a curved surface along the aspherical shape of the first region 11 being extended to the second region 12. The surface of the third region 13 is recessed relative to the virtual curved surface 11a. In other words, the surface shape of the third region 13 is discontiguous with the curved surface along the aspheric shape of the first region 11. The third region 13 increases the bulk of the first region 11 relative to the second region 12 in the thickness direction. The third region 13 is formed to surround the rim of the first region 11, and the surface shape of the third region 13 is rotationally symmetrical with respect to the central axis 15.

A lens having a protection film according to Embodiment 1 of the present invention is obtained by forming the protection film on the surface of the first region 11 of the lens substrate 10.

Pad printing or screen printing can be used as a method for forming the protection film.

As described with reference to FIGS. 24A to 24F, pad printing is a technique that involves the following. First, a printing plate with a printing shape being patterned thereon is filled with a coating, a flexible pad made of silicone rubber, etc., is pressed on the printing plate to transfer the coating from the printing plate to the pad, the pad is pressed on an object to be printed, and the coating is transferred from the pad to the object to be printed. Since printing is carried out through the flexible pad, it is possible to print favorably even on an object to be printed having a curved or bumpy surface.

On the other hand, screen printing is a technique that involves the following. A screen plate with a printing shape being patterned thereon is filled with a coating, and the screen plate is brought into contact with an object to be printed to carry out squeezing. As a result, the coating is printed on the object to be printed. Generally, screen printing is used for objects to be printed having a flat surface. However, by using a screen plate made of a flexible material, it is possible to print also on objects to be printed having a curved surface, such as a lens.

Figure 2:
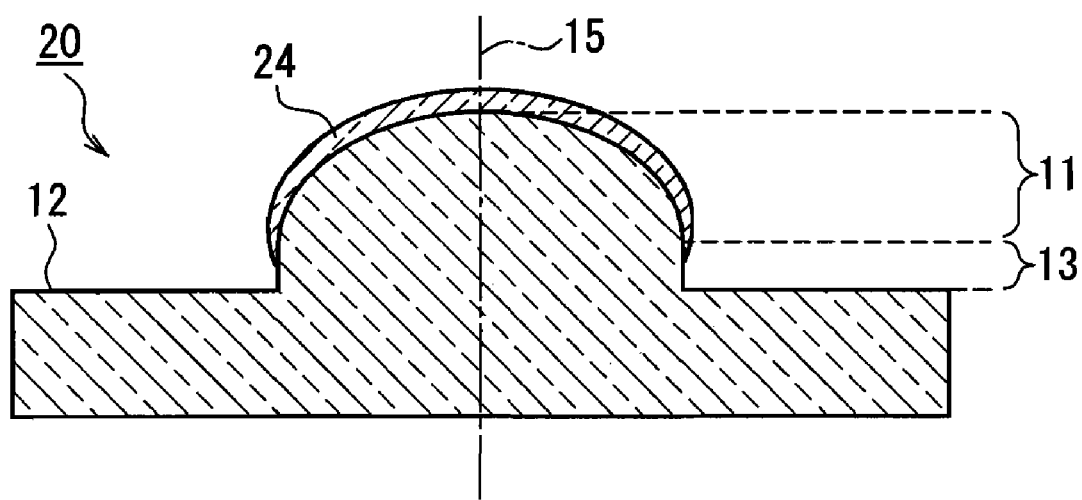
FIG. 2 is a cross-sectional view of a lens having a protection film according to Embodiment 1 of the present invention.

Since the bulk of the first region 11 is increased relative to the second region 12 surrounding the first region 11, when pad printing or screen printing is applied to the surface of the first region 11, flexibility in deformation of a pad or a screen plate improves. Thus, the pad or the screen plate easily can be brought into contact with the entire first region 11. Therefore, as shown in FIG. 2, it is possible to obtain a lens 20 having a protection film in which a protection film 24 having a substantially uniform film thickness is formed throughout the first region 11. The surface shape of the protection film 24 substantially matches the surface shape of the first region 11 before the formation of the protection film 24. Consequently, it is possible to enhance the concentration characteristic of the lens formed in the first region 11.

As described above, when the protection film 24 is formed on the first region 11 using pad printing or screen printing, it is difficult to form the protection film 24 in the vicinity of the border between the second region 12 and the third region 13. However, by designing the lens 20 such that the third region 13 does not contribute to the lens function, no problem occurs.

Unlike Embodiment 1, when the third region 3 is not provided, in other words, when the bulk of the first region 11 is not increased relative to the second region 12, the following problems occur. When a pad in pad printing or a screen plate in screen printing is pressed against the surface of the first region 11, it is difficult to bring the pad or the screen plate into contact with the periphery of the first region 11 in the vicinity of the second region 12. Accordingly, a protection film may not be formed on the rim of the first region 11 or the film thickness of the protection film may become small at the rim of the first region 11.

On the other hand, when the third region 13 is formed along the virtual curved surface 11a (see FIG. 1B) that is a curved surface along the surface shape of the first region 11 being extended or when the surface of the third region 13 is protruded from the virtual curved surface 11a, the following problem occurs. Generally, in pad printing or screen printing, the amount of adhesion of a coating is likely to be large at the rim of a region to which the coating adheres. In Embodiment 1, however, since the surface of the third region 13 is recessed relative to the virtual curved surface 11a, excess coating can be stored in a space between the virtual curved surface 11a and the surface of the third region 13. In contrast, when the surface of the third region 13 is in line with the virtual curved surface 11a or it is protruded from the virtual curved surface 11a, since there is no space to store excess coating, the film thickness of the protection film tends to be large at the rim of the first region 11 in the vicinity of the third region 13.

That is, in the present embodiment, since the third region 13 having a surface that is recessed relative to the virtual curved surface 11a is provided around the first region 11, it is possible to avoid the thickness of the protection film from becoming small at the rim of the first region 11 due to difficulty in bringing a pad or a screen plate into contact with the rim of the first region 11. Furthermore, it is also possible to avoid the thickness of the protection film from becoming large at the rim of the first region 11 due to the characteristics of pad printing or screen printing. Thus, according to the present embodiment, it is possible to form the protection film 24 having a uniform thickness throughout the first region 11.

Further, when the surface of the third region 13 is in line with the virtual curved surface 11a or it is protruded from the virtual curved surface 11a, the width of the third region 13 that does not contribute to the lens function increases in the radius direction about the central axis 15. Therefore, there is a chance that the third region 13 inhibits downsizing and integration of the lens. In the present embodiment, however, since the surface of the third region 13 is recessed relative to the virtual curved surface 11a, such a problem is less likely to occur. Thus, it is possible to downsize and integrate the lens with ease.

As described above, the third region 13 increases the bulk of the first region 11 relative to the second region 12 and its surface is recessed relative to the virtual curved surface 11a that is a curved surface along the surface shape of the first region 11 being extended. Thus, the protection film 24 having a surface that substantially matches the surface shape of the first region 11 can be formed throughout the first region 11.

The size (the width in the radius direction in a plan view as in FIG. 1A), the height (an increase in the bulk of the first region 11 from the second region 12 in FIG. 1B), etc. of the third region 13 can be set appropriately taking into consideration, for example, the conditions of contact between a pad in pad printing or a screen plate in screen printing and the first region 11. In pad printing, as long as a pressure to be applied to the first region 11 when the pad is pressed against the first region 11 is in an appropriate range, the thickness of the protection film 24 is less likely to be affected by the hardness and the shape of the pad as the third region 13 has a larger height. Further, in screen printing, as long as a pressure to be applied to the first region 11 when the screen plate is pressed against the first region 11 is in an appropriate range, the thickness of the protection film 24 becomes less likely to be affected by the tension of the screen plate as the third region 13 has a larger height. Generally, when the height of the third region 13 is one tenth or more of the thickness of the first region 11, the protection film 24 having a uniform thickness is more likely to be obtained. However, when the height of the third region 13 becomes too large, the first region 11 protrudes greatly relative to the second region 12. Thus, a local pressure is likely to be applied to the pad or the screen plate during printing, and thereby their life spans are likely to be shortened. Therefore, it is preferable that the height of the third region 13 is about equal to or less than the thickness of the first region 11.

The third region 13 may be formed, after a substrate including the first region 11 and the second region 12 is obtained, by reducing the thickness of the second region 12 in the thickness direction by cutting, etc., or the third region 13 may be formed simultaneously by integrally molding it with the substrate including the first region 11 and the second region 12.

In the above description, the surface shape of the first region 11 has been aspherical. However, the present invention is not limited thereto, and the surface shape may be spherical. Even in that case, the effects similar to the above can be achieved.

Embodiment 2

Figure 3A:
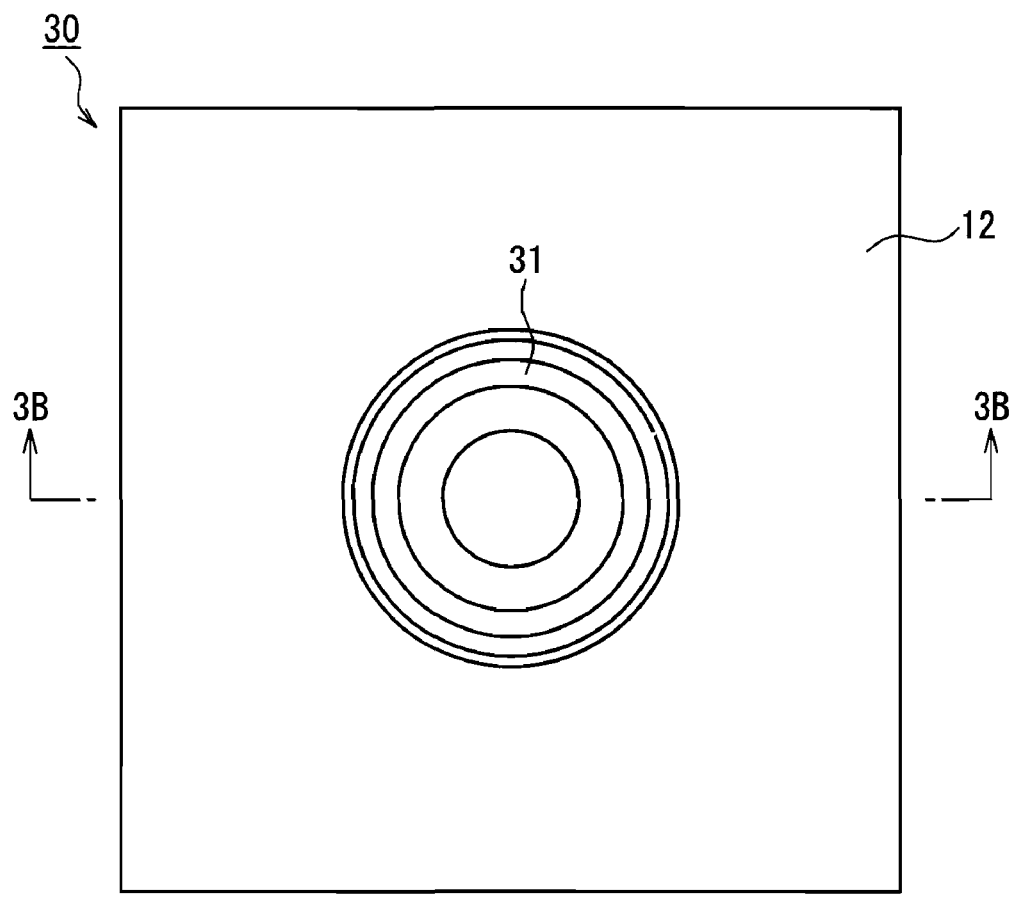
FIG. 3A is a top view of a lens substrate according to Embodiment 2 of the present invention.
Figure 3B:
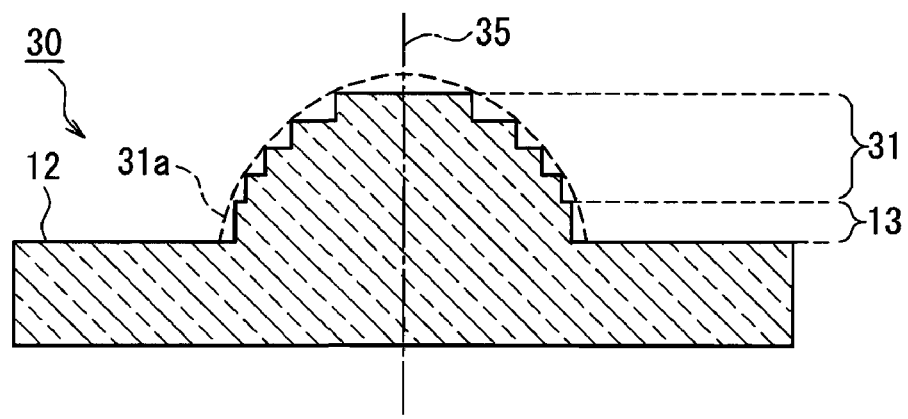
FIG. 3B is a sectional view taken along the line 3B-3B in FIG. 3A.

FIG. 3A is a top view of a lens substrate according to Embodiment 2 of the present invention, and FIG. 3B is a sectional view taken along the line 3B-3B in FIG. 3A. A lens substrate 30 in Embodiment 2 of the present invention includes, on one surface, a first region 31 having a lens function, a planar second region 12 formed around the first region 31, and a third region 13 provided between the first region 31 and the second region 12. The first region 31 is protruded relative to the second region 12 and its surface has a diffraction grating curved surface shape in which steps called a blazed grating are formed on a predetermined spherical or aspherical lens surface. The surface shape of the first region 31 is rotationally symmetrical with respect to a central axis 35 of the first region 31. Consequently, the first region 31 exerts a lens function utilizing diffraction. In FIG. 3B, a dashed line 31a indicates a virtual curved surface that is a curved surface (a curved surface connecting the upper end of each step of the blazed grating), namely, the diffraction grating curved surface along the surface shape of the first region 31 being extended to the second region 12. The surface of the third region 13 is recessed relative to the virtual curved surface 31a. That is, the surface shape of the third region 13 is discontiguous with the curved surface along the surface shape of the first region 31. The third region 13 increases the bulk of the first region 31 relative to the second region 12 in the thickness direction. The third region 13 is formed to surround the rim of the first region 31, and the surface shape of the third region 13 is rotationally symmetrical with respect to the central axis 35.

A lens having a protection film according to Embodiment 2 of the present invention is obtained by forming the protection film on the surface of the first region 31 of the lens substrate 30.

Similarly to the techniques described in Embodiment 1, pad printing or screen printing can be used to form the protection film.

Figure 4:
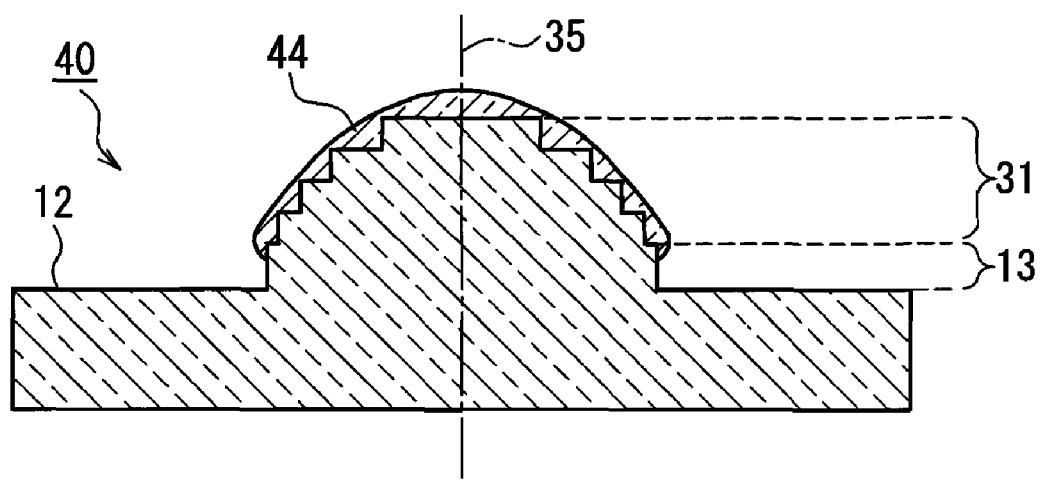
FIG. 4 is a cross-sectional view of a lens having a protection film according to Embodiment 2 of the present invention.

Similarly to Embodiment 1, since the bulk of the first region 31 is increased relative to the second region 12 surrounding the first region 31, when pad printing or screen printing is applied to the surface of the first region 31, flexibility in deformation of a pad or a screen plate improves. Thus, the pad or the screen plate easily can be brought into contact with the entire first region 31. Therefore, as shown in FIG. 4, it is possible to obtain a lens 40 having a protection film in which a protection film 44 is formed throughout the first region 31. The surface shape of the protection film 44 substantially matches the curved surface along the surface shape of the first region 31 before the formation of the protection film 44. Consequently, it is possible to enhance the concentration characteristic of the lens formed in the first region 31.

Also in Embodiment 2, when the protection film 44 is formed on the first region 31 using pad printing or screen printing, it is difficult to form the protection film 44 in the vicinity of the border between the second region 12 and the third region 13, as shown in FIG. 4. However, by designing the lens 40 such that the third region 13 does not contribute to the lens function, no problem occurs.

Unlike Embodiment 2, the following problem occurs when the third region 13 is not provided, in other words, when the bulk of the first region 31 is not increased relative to the second region 12.

In a diffraction grating lens, the stepped shape is formed even in the vicinity of the outer edge of the first region 31. Thus, even if a pad in pad printing or a screen plate in screen printing is pressed against the surface of the first region 31, it is particularly difficult to bring the pad or the screen plate into contact with the outer edge of the first region 31 due to its stepped shape in comparison with a spherical lens and an aspherical lens without a stepped shape. Therefore, a protection film may not be formed at the rim of the first region 31 or the film thickness of the protection film becomes small at the rim of the first region 31.

Further, in a diffraction grating lens, since the stepped shape formed in the first region 31 prevents a coating from moving and spreading in the first region 31 during printing, it is difficult to maintain the uniformity of the film thickness of the protection film in comparison with a spherical lens or an aspherical lens without a stepped shape. In some cases, areas that are not printed are developed in the stepped portion and they may remain in the first region 31 as air bubbles. In order to avoid this, it is important that a pressure applied to the diffraction grating lens when pressing the pad or the screen plate against the diffraction grating lens is strictly controlled to ensure favorable contact between the diffraction grating lens and the pad or the screen plate. Since the third region 13 that increases the bulk of the first region 31 relative to the second region 12 improves the contact between the first region 31 and the pad or the screen plate, it is particularly effective when forming the protection film 44 on the first region 31 where a diffraction grating is formed.

On the other hand, when the third region 13 is formed along the virtual curved surface 31a (see FIG. 3B) that is a curved surface along the surface shape of the first region 31 being extended or when the surface of the third region 13 is protruded from the virtual curved surface 11a, the film thickness of a protection film tends to become large at the rim of the first region 31 in the vicinity of the third region 13, as described in Embodiment 1.

That is, as described in Embodiment 1, the third region 13 having a surface that is recessed relative to the virtual curved surface 31a is provided around the first region 31 also in the present embodiment. Thus, it is possible to avoid the thickness of the protection film from becoming small or large at the rim of the first region 31. Thus, according to the present embodiment, it is possible to form the protection film 44 having a uniform film thickness throughout the first region 31.

Furthermore, as described in Embodiment 1, since the surface of the third region 13 is recessed relative to the virtual curved surface 31a also in the present embodiment, it is possible to downsize and integrate the lens with ease.

As described above, the third region 13 increases the bulk of the first region 31 relative to the second region 12 and its surface is recessed relative to the virtual curved surface 31a that is a curved surface along the surface shape of the first region 31 being extended. Thus, the protection film 44 having a surface that substantially matches the surface shape of the first region 31 can be formed throughout the first region 31.

The size (the width in the radius direction in a plan view as in FIG. 3A), the height (an increase in the bulk of the first region 31 from the second region 12 in FIG. 3B), etc. of the third region 13 can be set appropriately taking into consideration, for example, the conditions of contact between a pad in pad printing or a screen plate in screen printing and the first region 31. As described in Embodiment 1, it is preferable also in the present embodiment that the height of the third region 13 is one tenth or more of the thickness of the first region 31 in terms of obtaining the protection film 44 having a uniform thickness. On the other hand, it is preferable that the height of the third region 13 is about the same or smaller than the thickness of the first region 31 in terms of avoiding the life span of a pad or a screen plate from being shortened.

Refractive index adjusting protection films for correcting chromatic aberration in cameras, etc., have been known as protection films to be provided on the surface of diffraction grating lenses. When a protection film having dispersion that compensates a variation in the refractive index (i.e., dispersion) with respect to the wavelength of the material of a diffraction grating lens is formed on the diffraction grating, high diffraction efficiency can be achieved throughout a broadband. Consequently, it is possible to reduce chromatic aberration by incorporating into a camera module the diffraction grating lens on which the refractive index adjusting protection film is formed. A step d of a blazed grating that causes a first-order diffraction efficiency of a lens having a protection film to be 100% at a certain wavelength λ is given, when the refractive index of the diffractive grating lens is $n_L$ and the refractive index of the protection film is $n_P$, as the following formula (I).

$$d = \lambda / |n_L - n_P| \qquad (1)$$

When the right side of the formula (1) becomes constant throughout the entire visible range, there is no dependence of the diffraction efficiency on the wavelength in the visible range, and thereby it becomes possible to reduce chromatic aberration.

In the diffraction grating lens having a protection film according to Embodiment 2, the step of the diffraction grating is greater than or equal to the wavelength. Thus, it is important to form the surface of the protection film 44 smoothly regardless of whether the surface of the first region 31 is bumpy or not.

The third region 13 may be formed, after a substrate including the first region 31 and the second region 12 is obtained, by reducing the thickness of the second region 12 in the thickness direction by cutting, etc., or the third region 13 may be formed simultaneously by integrally molding it with the substrate including the first region 31 and the second region 12.

Embodiment 3

Figure 5A:
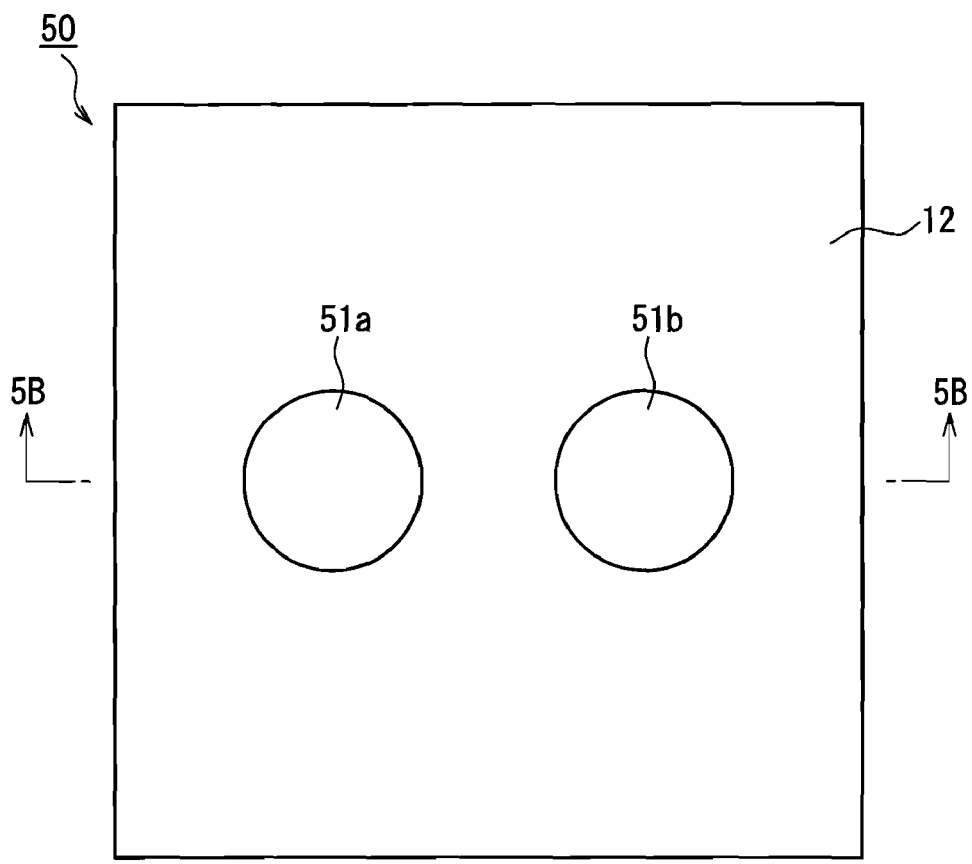
FIG. 5A is a top view of a lens substrate according to Embodiment 3 of the present invention.
Figure 5B:
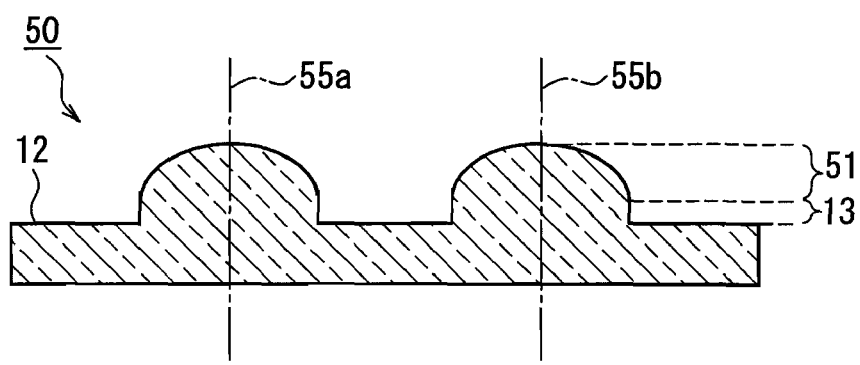
FIG. 5B is a sectional view taken along the line 5B-5B in FIG. 5A.

FIG. 5A is a top view of a lens substrate according to Embodiment 3 of the present invention, and FIG. 5B is a sectional view taken along the line 5B-5B in FIG. 5A. Two first regions 51a and 51b (they may be collectively referred to as a "first region 51") each having a lens function are provided on one surface of a lens substrate 50 in Embodiment 3 of the present invention. The lens substrate 50 in Embodiment 3 is the same as the lens substrate 10 in Embodiment 1 except that the number of the lenses is two. The first regions 51a and 51b have the same aspherical surface. The surface shape of the first region 51a is rotationally symmetrical with respect to a central axis 55a and the surface shape of the first region 51b is rotationally symmetrical with respect to a central axis 55b. Similarly to Embodiment 1, a planar second region 12 is formed around the first regions 51a and 51b, and third regions 13 are respectively provided between the first regions 51a and 51b and the second region 12. The third regions 13 are formed to surround the rim of the first regions 51a and 51b, and the surface shapes of the third regions 13 are rotationally symmetrical with respect to the central axis 55a and to the central axis 55b. By having a compound-eye configuration including two lenses, it is possible to measure the distance to an object by using triangulation utilizing a parallax between the lenses.

Similarly to Embodiment 1, a lens having a protection film according to Embodiment 3 of the present invention is obtained by forming protection films on the surface of the first regions 51a and 51b of the lens substrate 50. Similarly to Embodiment 1, it is possible to form protection films having a surface shape that substantially matches the surface shape of the first regions 51a and 51b before the formation of the protection films, and thereby the concentration characteristic of the lenses formed in the first regions 51a and 51b can be enhanced.

Generally, in a lens substrate for a multiple-eyed lens in which a plurality of lenses are disposed on the same plane, the lenses are disposed, in many cases, closely to each other. When forming a protection film on the first region of each lens in such a lens substrate, it is difficult to bring a pad in pad printing or a screen plate in screen printing into contact with the surface of the first region particularly at the periphery of each lens surface close to the adjacent lens. Thus, it is difficult to form a protection film throughout the first region. However, in Embodiment 3, since the third regions 13 increase the bulk of the first regions 51a and 51b relative to the second region 12, flexibility in deformation of a pad or a screen plate improves. Thus, the pad or the screen plate easily can be brought into contact with the entire first regions 51a and 51b. Therefore, it is possible to obtain a lens having a protection film in which protection films having a uniform film thickness are formed throughout the first regions 51a and 51b.

Further, when the surface of each of the third regions 13 is in line with a virtual curved surface that is a curved surface along the surface shape of each of the first regions 51a and 51b being extended or it is protruded from the virtual curved surface, the width of the third regions 13 that do not contribute to the lens function increases in the radius direction about the central axis 55*a* and about the central axis 55*b*. Thus, there is a chance that the third regions 13 inhibit downsizing and integration of the lens. In the present embodiment, however, since the surface of each of the third regions 13 is recessed relative to the virtual curved surface, such a problem is less likely to occur. Therefore, it is possible to downsize and integrate the lens with ease.

In the above description, the surface shape of the first region 51*a* and 51*b* has been aspherical. However, the present invention is not limited thereto, and the surface shape may be spherical. Even in that case, the effects similar to the above can be achieved.

Embodiment 4

Figure 6A:
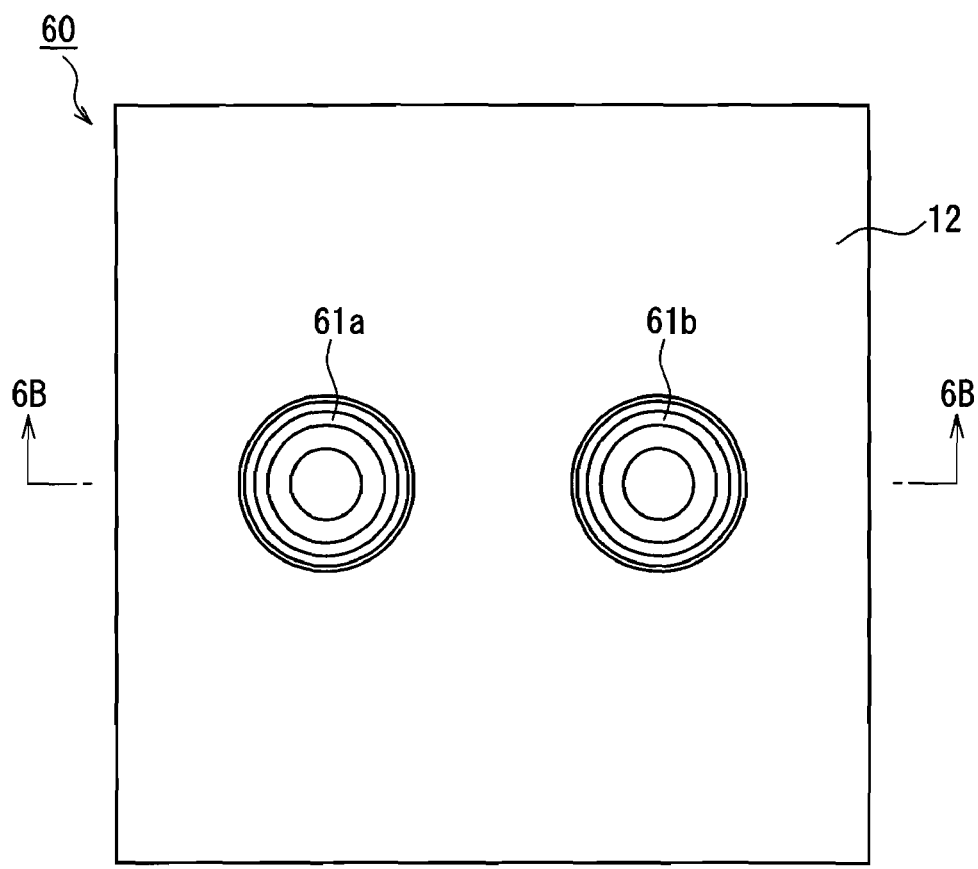
FIG. 6A is a top view of a lens substrate according to Embodiment 4 of the present invention.
Figure 6B:
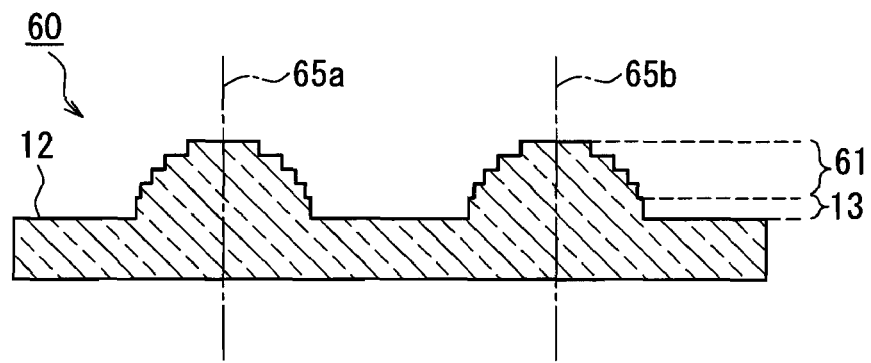
FIG. 6B is a sectional view taken along the line 6B-6B in FIG. 6A.

FIG. 6A is a top view of a lens substrate according to Embodiment 4 of the present invention, and FIG. 6B is a sectional view taken along the line 6B-6B in FIG. 6A. Two first regions 61*a* and 61*b* (they may be collectively referred to as a "first region 61") each having a lens function are provided on one surface of the lens substrate 60 in Embodiment 4 of the present invention. The lens substrate 60 in Embodiment 4 is the same as the lens substrate 30 in Embodiment 2 except that the number of the diffraction grating lenses are two. The first regions 61*a* and 61*b* have the same surface shape, and have a diffraction grating curved surface shape in which steps called a blazed grating are formed on a predetermined spherical or aspherical lens surface. The surface shape of the first region 61*a* is rotationally symmetrical with respect to a central axis 65*a* of the first regions 61*a* and the surface shape of the first region 61*b* is rotationally symmetrical with respect to a central axis 65*b* of the first regions 61*b*. Similarly to Embodiment 2, a planate second region 12 is formed around the first regions 61*a* and 61*b*, and third regions 13 are respectively provided between the first regions 61*a* and 61*b* and the second region 12. The third regions 13 are formed to surround the rim of the first regions 61*a* and 61*b*, and the surface shapes of the third regions 13 are rotationally symmetrical with respect to the central axis 55*a* and to the central axis 55*b*. By having a compound-eye configuration including two diffraction grating lenses, it is possible to measure the distance to an object by using triangulation utilizing a parallax between the lenses.

Similarly to Embodiment 2, a lens having a protection film according to Embodiment 4 of the present invention is obtained by forming protection films on the surface of the first regions 61*a* and 61*b* of the lens substrate 60. Similarly to Embodiment 2, it is possible to form protection films having a surface shape that substantially matches a curved surface along the surface shape of the first regions 61*a* and 61*b* before the formation of the protection films, and thereby the concentration characteristic of the lenses formed in the first regions 61*a* and 61*b* can be enhanced.

Generally, in a lens substrate for a multiple-eyed lens in which a plurality of diffraction grating lenses are disposed on the same plane, the diffraction grating lenses are disposed, in many cases, closely to each other. When forming a protection film on the first region of each lens in such a lens substrate, it is difficult to bring a pad in pad printing or a screen plate in screen printing into contact with the surface of the first region particularly at the periphery of each lens surface close to the adjacent lens. Thus, it is difficult to form a protection film throughout the first region. However, in Embodiment 4 similarly to Embodiment 3, since the third regions 13 increase the bulk of the first regions 61*a* and 61*b* relative to the second region 12, flexibility in deformation of a pad or a screen plate improves. Thus, the pad or the screen plate easily can be brought into contact with the entire first regions 61*a* and 61*b*.

Therefore, it is possible to obtain a lens having a protection film in which protection films having a uniform film thickness are formed throughout the first regions 61*a* and 61*b*.

Further, when the surface of each of the third regions 13 is in line with a virtual curved surface that is a curved surface (i.e., diffraction grating curved surfaces) along the surface shape of each of the first regions 61*a* and 61*b* being extended or it is protruded from the virtual curved surface, the width of the third regions 13 that do not contribute to the lens function increases in the radius direction about the central axis 65*a* and about the central axis 65*b*. Thus, there is a chance that the third regions 13 inhibit downsizing and integration of the lens. In the present embodiment, however, since the surface of each of the third regions 13 is recessed relative to the virtual curved surface, such a problem is less likely to occur. Therefore, it is possible to downsize and integrate the lens with ease.

Embodiments 1 to 4 described above are merely examples, and the present invention is not limited thereto and a variety of modifications can be made.

For example, although the lens substrates each including two lenses have been described in Embodiments 3 and 4, the number of the lenses is not limited to two and may be three or more. Even in that case, the effects similar to the above can be achieved.

In Embodiments 1 to 4, in each cross-sectional view including the central axis of the first region, the outer surface of the third region 13 is indicated by two straight lines in parallel with the central axis. However, the present invention is not limited thereto and the outer surface of the third region 13 may be tapered and indicated by two straight lines that are spaced wider on the second region side than on the first region side or may be indicated by two curved lines that smoothly connect the first region and the second region.

In Embodiments 1 to 4, although the central axis of the first region has been perpendicular to the surface of the second region, it may be tilted with respect to the surface of the second region. Further, in Embodiments 1 to 4, the first region and the third region have been rotationally symmetrical with respect to the central axis of the first region. However, both or one of the first region and the third region may be rotationally asymmetrical with respect to the central axis of the first region. Furthermore, in Embodiments 1 to 4, the height (the distance from the surface of the second region to the outer end of the first region along the direction of the normal to the surface of the second region) of the third region has been constant in the circumferential direction of the first region. However, it may be varied in the circumferential direction of the first region. For example, even when in the circumferential direction of the first region there is a portion where the height of the third region is almost close to zero, as long as it can be confirmed that the third region is substantially formed throughout the rim of the first region such as when the length of the portion in the circumferential direction is extremely small, such a configuration is included in the scope of the present invention, and the effects similar to the above can be achieved.

Further, in Embodiments 1 to 4, although a lens (the first region) has been formed on one surface of the lens substrate and the other surface has been a plane, the present invention is not limited thereto. For example, lenses may be formed on both surfaces of the lens substrate. Even in that case, the effects similar to the above can be achieved.

When forming lenses on both surfaces of a lens substrate, the shape of the lenses on the both surfaces may be the same or may be different from each other. For example, it is possible to form an aspherical refractor lens on one surface and a diffraction grating lens on the other surface. Furthermore, when forming lenses on both surfaces of a lens substrate, a protection film may be formed on each lens on both surfaces or only the lens on one surface. In either case, the effects similar to the above can be achieved.

When forming a plurality of lenses on one surface of the lens substrate, all of the plurality of lenses do not have to have the same configuration. For example, a lens whose first region or third region is configured differently from other lenses may be included. Or, a lens having a protection film and a lens without a protection film may be included.

EXAMPLES

Hereinafter, the lens having a protection film of the present invention and the method for manufacturing the lens will be described with reference to specific examples.

Example 1

As Example 1, a lens substrate 10 as shown in FIGS. 1A and 1B was prepared using polycarbonate (manufactured by Teijin Chemicals, Ltd., AD-5503) as its material. The lens substrate 10 included a first region 11 having an aspherical shape, a second region 12 formed around the first region 11 and composed of a plane, and a third region 13 provided between the first region 11 and the second region 12. The shape of the lens substrate 10 in a plan view (the shape viewed parallel to the direction of the normal to the second region 12) was a square of 4 mm×4 mm, the shape of the first region 11 disposed at the center of the lens substrate 10 was, in a plan view, a circle with a diameter of 1.2 mm. The thickness between the bottom of the lens substrate 10 and the apex of the first region 11 was set to 0.8 mm, the thickness between the bottom and the upper surface of the second region 12 was set to 0.5 mm, and the third region was formed in a cylindrical shape with a diameter of 1.2 mm and a thickness of 0.1 mm.

As a coating for a protection film 24, a solution was prepared by mixing a photopolymerization initiator into acrylic-based oligomer (manufactured by NIPPON GOHSEI, UV-7000B) and diluting the resultant with propylene glycol monomethyl ether so as to have a viscosity of 5 Pa·s. The coating was applied to the first region 11 of the lens substrate 10 using pad printing. The method will be described with reference to FIGS. 25A to 25F.

Figure 25A:
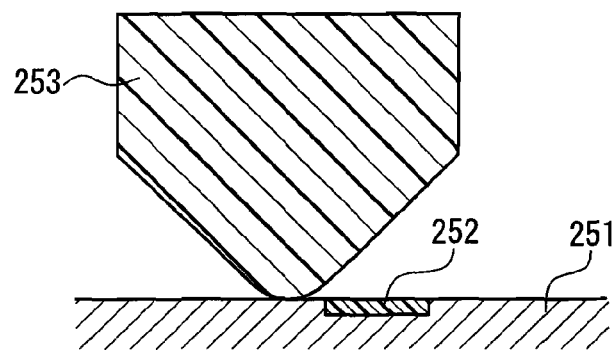
FIG. 25A is a cross-sectional view showing a step of pad printing in Example 1 of the present invention.
Figure 25B:
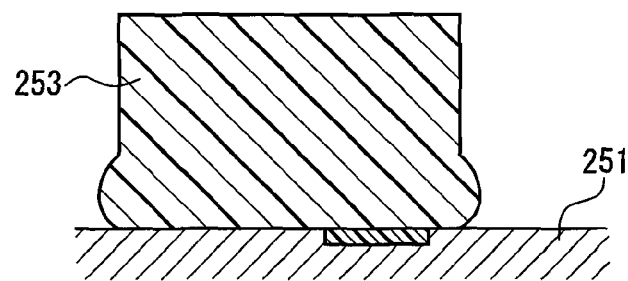
FIG. 25B is a cross-sectional view showing a step of the pad printing in Example 1 of the present invention.
Figure 25C:
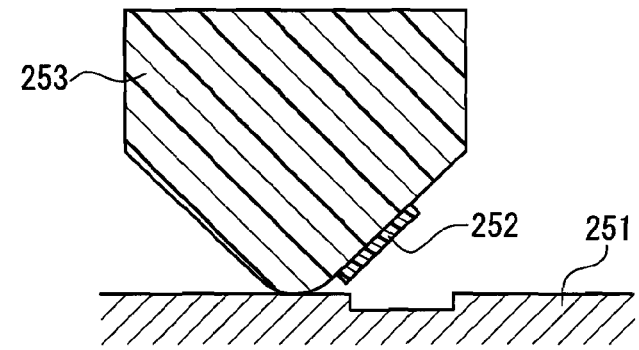
FIG. 25C is a cross-sectional view showing a step of the pad printing in Example 1 of the present invention.
Figure 25D:
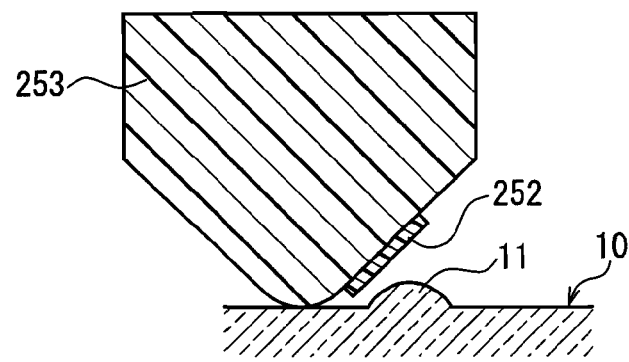
FIG. 25D is a cross-sectional view showing a step of the pad printing in Example 1 of the present invention.
Figure 25E:
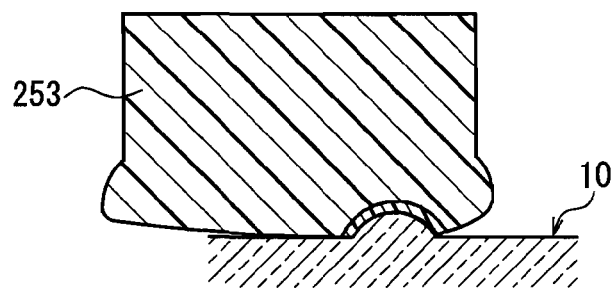
FIG. 25E is a cross-sectional view showing a step of the pad printing in Example 1 of the present invention.
Figure 25F:
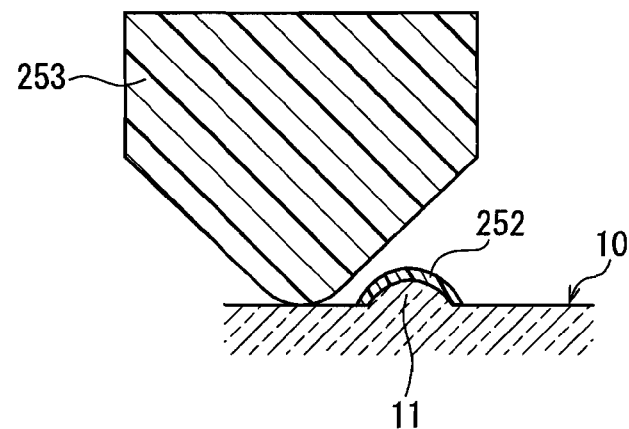
FIG. 25F is a cross-sectional view showing a step of the pad printing in Example 1 of the present invention.

As shown in FIG. 25A, a steel plate with a concave portion having a depth of 25 μm and a diameter of 1.6 mm being patterned thereon was prepared as a printing plate 251. The concave portion of the printing plate 251 was filled with the coating 252. A pad made of silicone rubber having a substantially cone-shaped tip portion was used as a pad 253. A pad printer 80GPH-PLUS (manufactured by Mishima Co., Ltd.) was used. As shown in FIG. 25B, the pad 253 was pressed on the printing plate 251 such that the apex of the pad 253 was to be landed on a position off the concave portion, and as shown in FIG. 25C, the coating 252 was transferred to a cone surface (slope) of the pad 253. Next, as shown in FIG. 25D, the pad 253 with the coating 252 being adhered thereto was moved over the lens substrate 10, the apex of the pad 253 was landed on a position off the first region 11 of the lens substrate 10, and by pressing the pad 253 on the lens substrate 10 as shown in FIG. 25E, the coating 252 was transferred to the first region 11 as shown in FIG. 25F. It had been confirmed empirically that when the coating 252 on the printing plate 251 was transferred to the apex of the substantially cone-shape pad 253 and thereafter the coating 252 was transferred to the first region 11 of the lens substrate 10, the film thickness of the protection film to be formed on the first region 11 became small at the center and large at the rim. Therefore, the position on the pad 253 where the coating 252 was adhered was set to the cone surface off the apex of the pad 253. In order to obtain a protection film having a desired thickness, pad printing was carried out three times on one first region 11 under the same conditions.

Then, after vaporizing the solvent in the coating by carrying out decompression for 10 minutes at ambient temperature, UV irradiation was carried out under illuminance of 120 mW/cm$^2$ and an accumulated light amount of 5000 mJ/cm$^2$ to cure the coating, and thereby a lens 20 having a protection film shown in FIG. 2 in which the protection film 24 was formed was obtained. The protection film 24 was formed only on the portion with which the pad 253 with the coating 252 being adhered thereto came into contact. Accordingly, the protection film 24 was not formed on the third region 13 between the first region 11 and the second region 12 since the pad 253 hardly came into contact with the third region 13.

Comparative Example 1

Figure 7A:
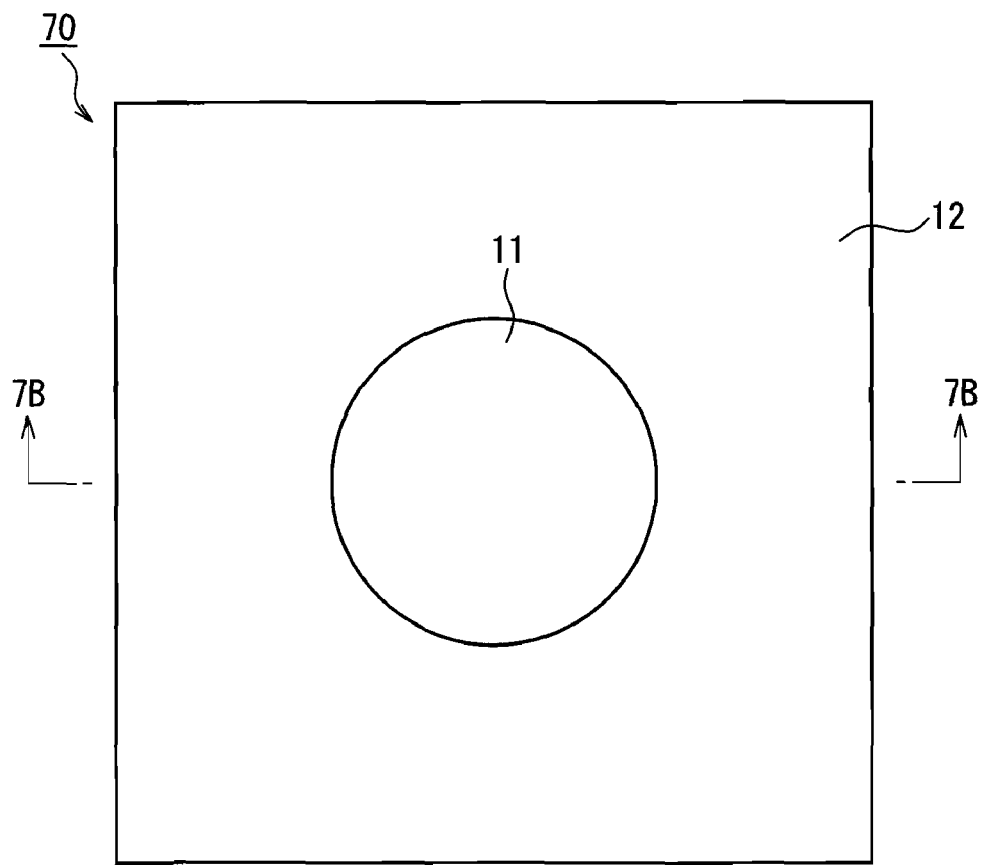
FIG. 7A is a top view of a lens substrate according to Comparative Example 1.
Figure 7B:
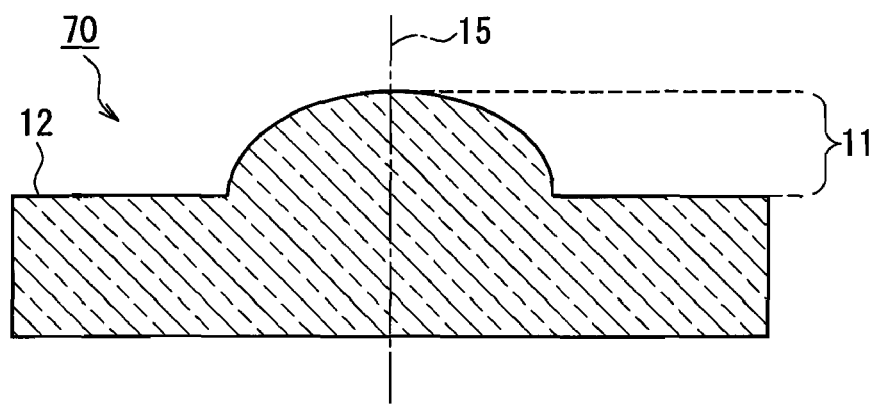
FIG. 7B is a sectional view taken along the line 7B-7B in FIG. 7A.
Figure 8:
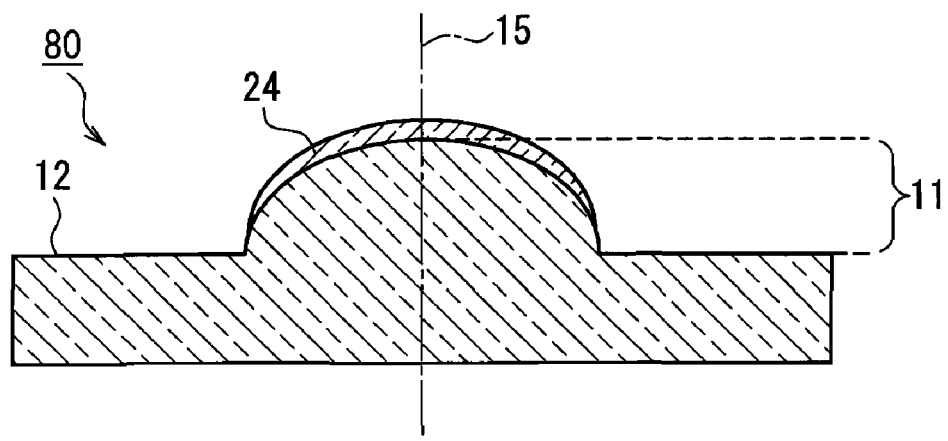
FIG. 8 is a cross-sectional view of a lens having a protection film according to Comparative Example 1.

As Comparative Example 1, a lens substrate 70 as shown in FIGS. 7A and 7B was prepared. The lens substrate 70 was the same as the lens substrate 10 in Example 1 except that the third region 13 was not provided. The thickness between the bottom of the lens substrate 70 and the apex of the first region 11 was set to 0.8 mm, the thickness between the bottom and the upper surface of the second region 12 was set to 0.6 mm, and other sizes and the material were set completely the same as those in Example 1. The protection film 24 was formed on the first region 11 of the lens substrate 70 using the same coating and the same method as those in Example 1, and the lens 80 having a protection film as shown in FIG. 8 was obtained. Also in Comparative Example 1, the protection film 24 was formed only on the portion with which the pad with the coating being adhered thereto came into contact during the pad printing. Therefore, the protection film 24 was not formed at the border between the first region 11 and the second region 12 since the pad hardly came into contact with the border.

Figure 9:
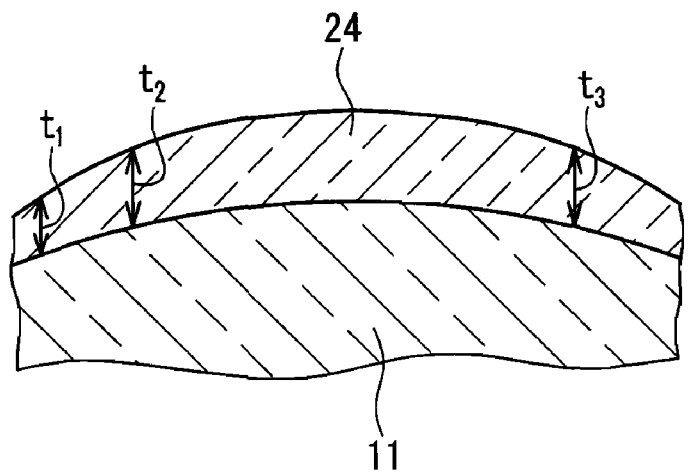
FIG. 9 is a cross-sectional view for describing a method for measuring the film thickness of a protection film formed on a refractor lens.
Figure 10:
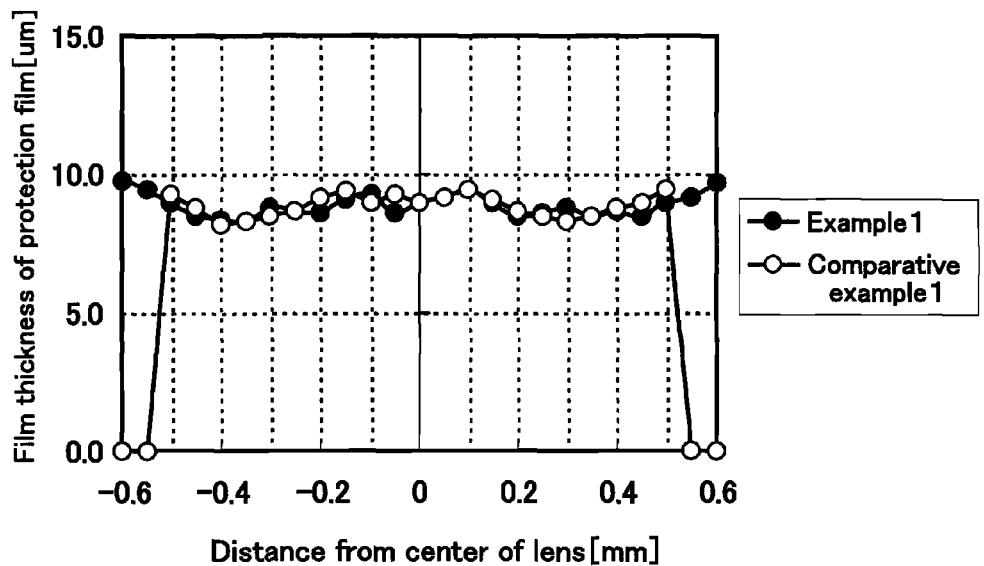
FIG. 10 is a graph showing a result of measuring the film thickness of protection films in Example 1 and Comparative Example 1.

The film thickness of the protection films 24 on the first regions 11 of the respective lenses having a protection film obtained in Example 1 and Comparative Example 1 was measured. A method for measuring the film thickness will be described with reference to FIG. 9. The surface shape of each of the first regions 11 before and after the formation of the protection film 24 was measured along a given cross section including the central axis 15 using laser probe 3-dimension measuring equipment. Differences t1, t2, t3, . . . between the surface shape of the first region 11 before the formation of the protection film 24 and the surface shape of the protection film 24 in the direction of the central axis 15 were defined as the film thickness of the protection film 24. The measuring pitch was set to 0.05 mm. FIG. 10 shows the results.

As can be seen from FIG. 10, in Comparative Example 1 where the third region 13 was not formed, it was confirmed that the film thickness at the rim of the first region 11 was almost zero and there were areas in the first region 11 where the protection film 24 was not formed. In contrast, in Example 1 where the third region 13 was formed, it was confirmed that there was almost no variation in the film thickness throughout the center portion to the rim of the first region 11, and the protection film 24 was formed throughout the first region 11 in a substantially uniform manner. In other words, it was confirmed that the protection film 24 having a surface shape that substantially matched the aspherical shape of the first region 11 was formed.

The above result was based upon favorable conditions of the contact between the pad 253 and the first region 11 during the pad printing due to the third region 13 for increasing the bulk of the first region 11 relative to the second region 12 being provided.

Example 2

As Example 2, a lens substrate 10 as shown in FIGS. 1A and 1B was prepared using optical glass (manufactured by Sumita Optical glass, Inc., K-LaKn14) as its material. The shape and the size of the lens substrate 10 were the same as those in Example 1. By forming the protection film 24 on the first region 11 of the lens substrate 10 using the same coating and the same method as those in Example 1, a lens 20 having a protection film as shown in FIG. 2 was obtained.

Comparative Example 2

As Comparative Example 2, a lens substrate 70 as shown in FIGS. 7A and 7B that was the same as the lens substrate 10 in Example 2 except that the third region 13 was not provided was prepared. The thickness between the bottom of the lens substrate 70 and the apex of the first region 11 was set to 0.8 mm, the thickness between the bottom and the upper surface of the second region 12 was set to 0.6 mm, and other sizes and the material were set completely the same as those in Example 2. By forming the protection film 24 on the first region 11 of the lens substrate 70 using the same coating and the same method as those in Example 2, a lens 80 having a protection film as shown in FIG. 8 was obtained.

Figure 11:
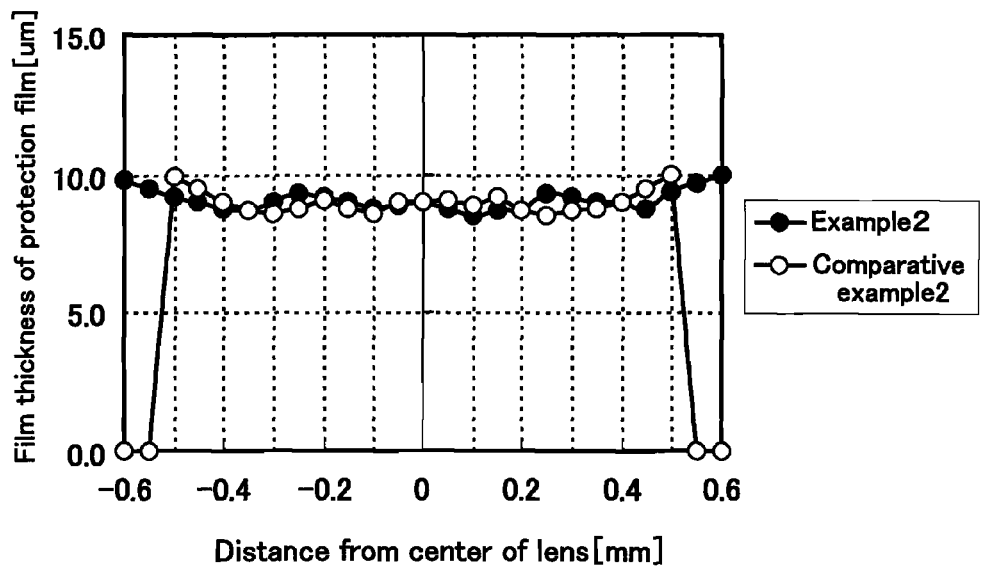
FIG. 11 is a graph showing a result of measuring the film thickness of protection films in Example 2 and Comparative Example 2.

The film thickness of the protection films 24 on the first regions 11 of the respective lenses having a protection film obtained in Example 2 and Comparative Example 2 was measured using the method described with reference to FIG. 9. FIG. 11 shows the results.

As can be seen from FIG. 11, in Comparative Example 2 where the third region 13 was not formed, it was confirmed that, similarly to Comparative Example 1, there were areas on the rim of the first region 11 where the protection film 24 was not formed. In contrast, in Example 2 where the third region 13 was formed, it was confirmed that, similarly to Example 1, there was almost no variation in the film thickness throughout the center portion to the rim of the first region 11, and the protection film 24 was formed throughout the first region 11 in a substantially uniform manner. In other words, it was confirmed that the protection film 24 having a surface shape that substantially matched the aspherical shape of the first region 11 was formed.

Example 3

As Example 3, a lens substrate 30 as shown in FIGS. 3A and 3B was prepared using polycarbonate (manufactured by Teijin Chemicals Ltd., AD-5503, d-line refractive index: 1.59, Abbe's number: 28) as its material. The lens substrate 30 included a first region 31 having a blazed grating curved surface, a second region 12 formed around the first region 31 and composed of a plane, and a third region 13 provided between the first region 31 and the second region 12. The shape of the lens substrate 30 in a plan view was a square of 4 mm×4 mm, the shape of the first region 31 disposed at the center of the lens substrate 30 was, in a plan view, a circle with a diameter of 1.2 mm. The thickness between the bottom of the lens substrate 30 and the apex of the first region 31 was set to 0.8 mm, the thickness between the bottom and the upper surface of the second region 12 was set to 0.5 mm, and the third region 31 was formed in a cylindrical shape with a diameter of 1.2 mm and a thickness of 0.1 mm. The step height of the blazed grating formed on the first region 31 was set to 15.5 µm.

A propylene glycol monomethyl ether dispersion in which a mixture of an alicyclic hydrocarbon group-containing acrylic-based oligomer (d-line refractive index: 1.53, Abbe's number: 52) and a zirconium oxide filler (primary particle diameter: 3 to 10 nm, containing 30 wt% of a silane-based surface treating agent, the weight ratio to solid is 56 wt%) was dispersed was prepared as a coating for a protection film 44. The coating was prepared to have a viscosity of 5 Pa·s. Then, pad printing, solvent vaporization, and UV irradiation were carried out under the same conditions as those in Example 1, and thereby a lens 40 having a protection film as shown in FIG. 4 on which the protection film 44 was formed was obtained. Similarly to Example 1, the pad printing was carried out three times on one first region 31 under the same conditions. The protection film 44 was formed only on the portion with which a pad with the coating being adhered thereon came into contact during the pad printing. Therefore, similarly to Example 1, since the pad hardly came into contact with the third region 13 between the first region 31 and the second region 12, the protection film 44 was not formed on the third region 13. The refractive index property of the protection film 44 after being cured was examined, and the d-line refractive index was 1.62 and the Abbe's number was 43.

By selecting the materials for each of the lens substrate 30 on which the diffractive grating lens was formed and the protection film 44 as described above, and setting the step height of the blazed grating as described above, the diffraction grating lens with reduced chromatic aberration was obtained.

Comparative Example 3

Figure 12A:
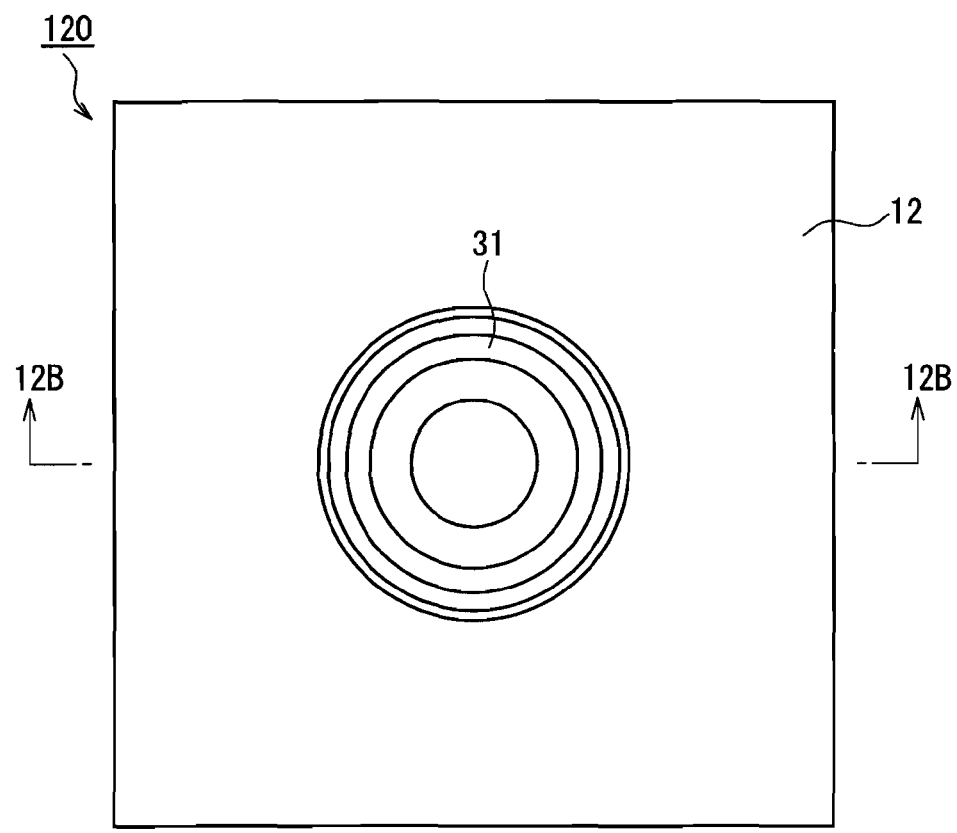
FIG. 12A is a top view of a lens substrate according to Comparative Example 3.
Figure 12B:
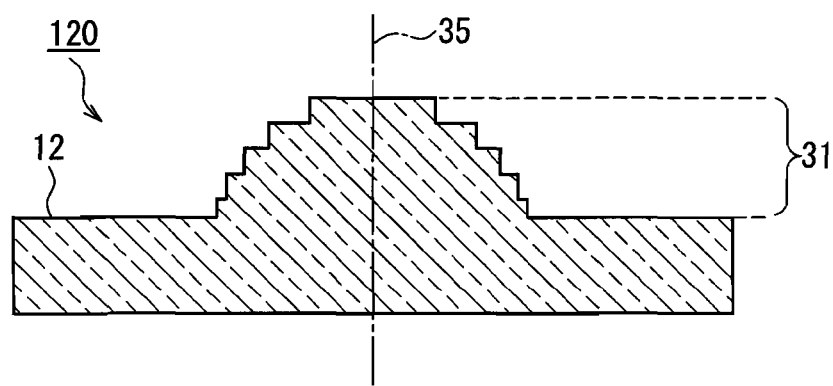
FIG. 12B is a sectional view taken along the line 12B-12B in FIG. 12A.
Figure 13:
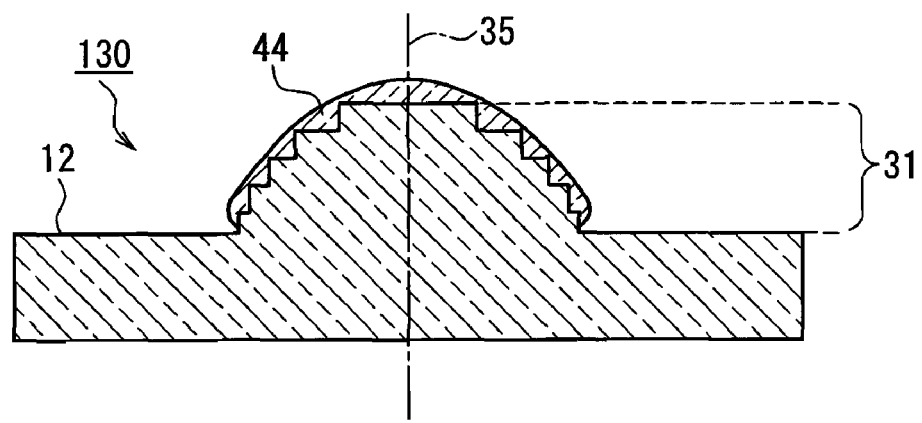
FIG. 13 is a cross-sectional view of a lens having a protection film according to Comparative Example 3.

As Comparative Example 3, a lens substrate 120 as shown in FIGS. 12A and 12B that was the same as the lens substrate 30 in Example 3 except that the third region 13 was not provided was prepared. The thickness between the bottom of the lens substrate 120 and the apex of the first region 31 was set to 0.8 mm, the thickness between the bottom and the upper surface of the second region 12 was set to 0.6 mm, and other sizes and the material were set completely the same as those in Example 3. By forming the protection film 44 on the lens substrate 120 using the same coating and the same method as those in Example 3, a lens 130 having a protection film as shown in FIG. 13 was obtained.

Figure 14:
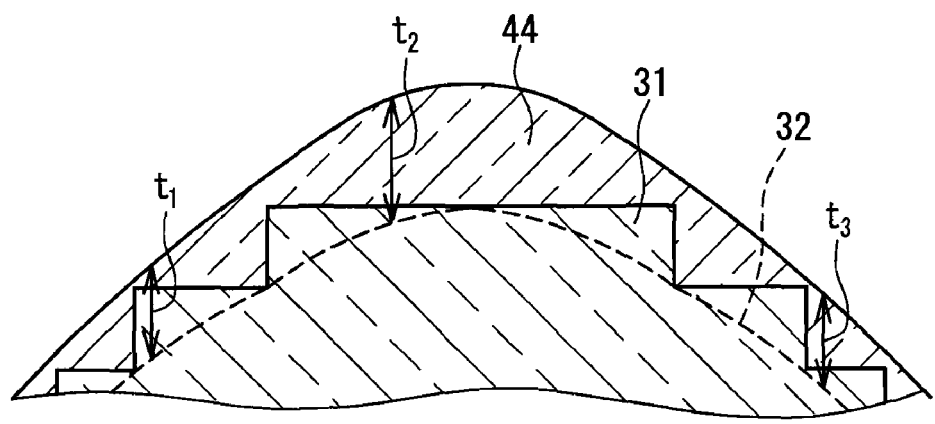
FIG. 14 is a cross-sectional view for describing a method for measuring the film thickness of a protection film formed on a diffraction grating lens.
Figure 15:
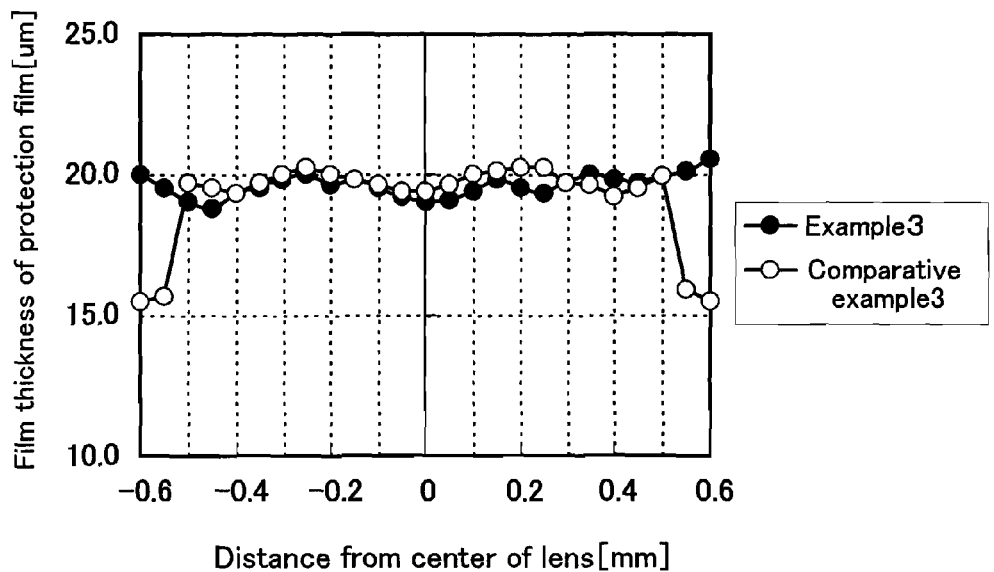
FIG. 15 is a graph showing a result of measuring the film thickness of protection films in Example 3 and Comparative Example 3.

The film thickness of the protection films 44 on the first regions 31 of the respective lenses having a protection film obtained in Example 3 and Comparative Example 3 was measured. A method for measuring the film thickness will be described with reference to FIG. 14. The surface shape of each of the first regions 31 before and after the formation of the protection film 44 was measured along a given cross section including the central axis 35 using a laser reflection shape measuring device. Next, a curved line (a dashed line 32 shown in FIG. 14) connecting the undersurfaces of the steps of the blazed grating was determined from the results of measuring the surface shape of each of the first regions 31 before the formation of the protection film 44, and differences t1, t2, t3, . . . between the curved line and the surface shape of each of the protection films 44 in the direction of the central axis 35 were defined as the film thickness of each of the protection films 44. When the film thickness t1, t2, t3, ... was constant, then the surface shape of the protection film 44 would match the surface shape of the diffraction grating curved surface. The measuring pitch was set to 0.05 mm. FIG. 15 shows the results.

As can be seen from FIG. 15, in Comparative Example 3 where the third region 13 was not formed, it was confirmed that, similarly to Comparative Examples 1 and 2, there were areas on the rim of the first region 31 where the protection film 44 was not formed. In contrast, in Example 3 where the third region 13 was formed, it was confirmed that there was almost no variation in the film thickness throughout the center portion to the rim of the first region 31, and the protection film 44 was formed throughout the first region 31 in a substantially uniform manner. In other words, it was confirmed that the protection film 44 having a surface shape that substantially matched the aspherical shape of the diffraction grating curved surface of the first region 31 was formed.

Example 4

As Example 4, a lens substrate 30 as shown in FIGS. 3A and 3B was prepared using optical glass (manufactured by Sumita Optical glass, Inc., K-LaKn14, d-line refractive index: 1.74, Abbe's number: 53) as its material. Similarly to Example 3, the lens substrate 30 included a first region 31 having a blazed grating curved surface, a second region 12 formed around the first region 31 and composed of a plane, and a third region 13 provided between the first region 31 and the second region 12. The shape of the lens substrate 30 in a plan view was a square of 4 mm×4 mm, the shape of the first region 31 disposed at the center of the lens substrate 30 was, in a plan view, a circle with a diameter of 1.2 mm. The thickness between the bottom of the lens substrate 30 and the apex of the first region 31 was set to 0.8 mm, the thickness between the bottom and the upper surface of the second region 12 was set to 0.5 mm, and the third region 31 was formed in a cylindrical shape with a diameter of 1.2 mm and a thickness of 0.1 mm. The step height of the blazed grating formed on the first region 31 was set to 4.7 µm.

As a coating for a protection film 44, a methyl ethyl ketone solution of epoxy-based oligomer (manufactured by Asahi Denka Co., Ltd., Optomer KRX, d-line refractive index: 1.62, Abbe's number: 24) was prepared. The coating was prepared to have a viscosity of 5 Pa·s. Then, pad printing, solvent vaporization, and UV irradiation were carried out under the same conditions as those in Example 3, and a lens 40 having a protection film shown in FIG. 4 on which the protection film 44 was formed was obtained. The pad printing was carried out twice on one first region 31 under the same conditions. Similarly to Example 3, by selecting the materials for each of the lens substrate 30 on which the diffractive grating lens was formed and the protection film 44 as described above, and setting the step height of the blazed grating as described above, the diffraction grating lens with reduced chromatic aberration was obtained also in Example 4.

Comparative Example 4

As Comparative Example 4, a lens substrate 120 as shown in FIGS. 12A and 12B that was the same as the lens substrate 30 in Example 4 except that the third region 13 was not provided was prepared. The thickness between the bottom of the lens substrate 120 and the apex of the first region 31 was set to 0.8 mm, the thickness between the bottom and the upper surface of the second region 12 was set to 0.6 mm, and other sizes and the material were completely the same as those in Example 4. By forming the protection film 44 on the lens substrate 120 using the same coating and the same method as those in Example 4, a lens 130 having a protection film as shown in FIG. 13 was obtained.

Figure 16:
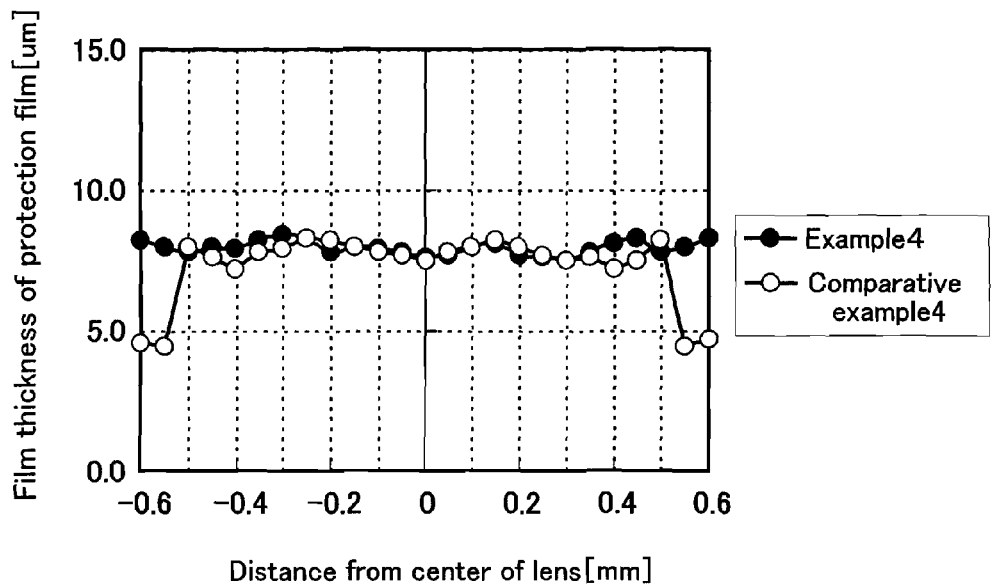
FIG. 16 is a graph showing a result of measuring the film thickness of protection films in Example 4 and Comparative Example 4.

The film thickness of the protection films 44 on the first regions 31 of the respective lenses having a protection film obtained in Example 4 and Comparative Example 4 was measured using the method described with reference to FIG. 14. FIG. 16 shows the results.

As can be seen from FIG. 16, in Comparative Example 4 where the third region 13 was not formed, it was confirmed that, similarly to Comparative Example 3, there were areas on the rim of the first region 31 where the protection film 44 was not formed. In contrast, in Example 4 where the third region 13 was formed, it was confirmed that, similarly to Example 3, there was almost no variation in the film thickness throughout the center portion to the rim of the first region 31, and the protection film 44 was formed throughout the first region 31 in a substantially uniform manner. In other words, it was confirmed that the protection film 44 having a surface shape that substantially matched the aspherical shape of the diffraction grating curved surface of the first region 31 was formed.

Example 5

As Example 5, a compound-eye lens substrate 50 as shown in FIGS. 5A and 5B was prepared using polycarbonate (manufactured by Teijin Chemicals Ltd., AD-5503) as its material. Two first regions 51a and 51b each having a lens function were disposed on one surface of the lens substrate 50. The lens substrate 50 in Example 5 was the same as the lens substrate 10 in Example 1 except that the number of the lenses was two. The lens substrate 50 included the two first regions 51a and 51b each having an aspherical shape, the second region 12 formed around the first regions 51a and 51b and composed of a plane, and the third regions 13 provided respectively between the first regions 51a and 51b and the second region 12. The shape of the lens substrate 50 in a plan view was a square of 5 mm×5 mm, the shape of each of the two first regions 51a and 51b disposed in the vicinity of the center of the lens substrate 50 was, in a plan view, a circle with a diameter of 1.2 mm. The thickness between the bottom of the lens substrate 50 and the apex of each of the first regions 51a and 51b was set to 0.8 mm, the thickness between the bottom and the upper surface of the second region 12 was set to 0.5 mm, and each of the third regions 13 was formed in a cylindrical shape with a diameter of 1.2 mm and a thickness of 0.1 mm. The distance between the central axis 55a of the first region 51a and the central axis 55b of the first region 51b was set to 2.2 mm.

The same solution as that in Example 1 was prepared as a coating for the protection film. As a printing plate, a steel plate on which two concave portions having a depth of 25 µm and a diameter of 1.6 mm had been patterned at 2.2 mm in distance between the centers was prepared. The coating charged in the concave portions of the printing plate was applied to the first regions 51a and 51b of the lens substrate 50 using pad printing. The pad printing was carried out three times on each of the first regions 51a and 51b under the same conditions. Then, solvent vaporization, and UV irradiation were carried out under the same conditions as those in Example 1, and thereby the lenses having a protection film were obtained.

Comparative Example 5

Figure 17A:
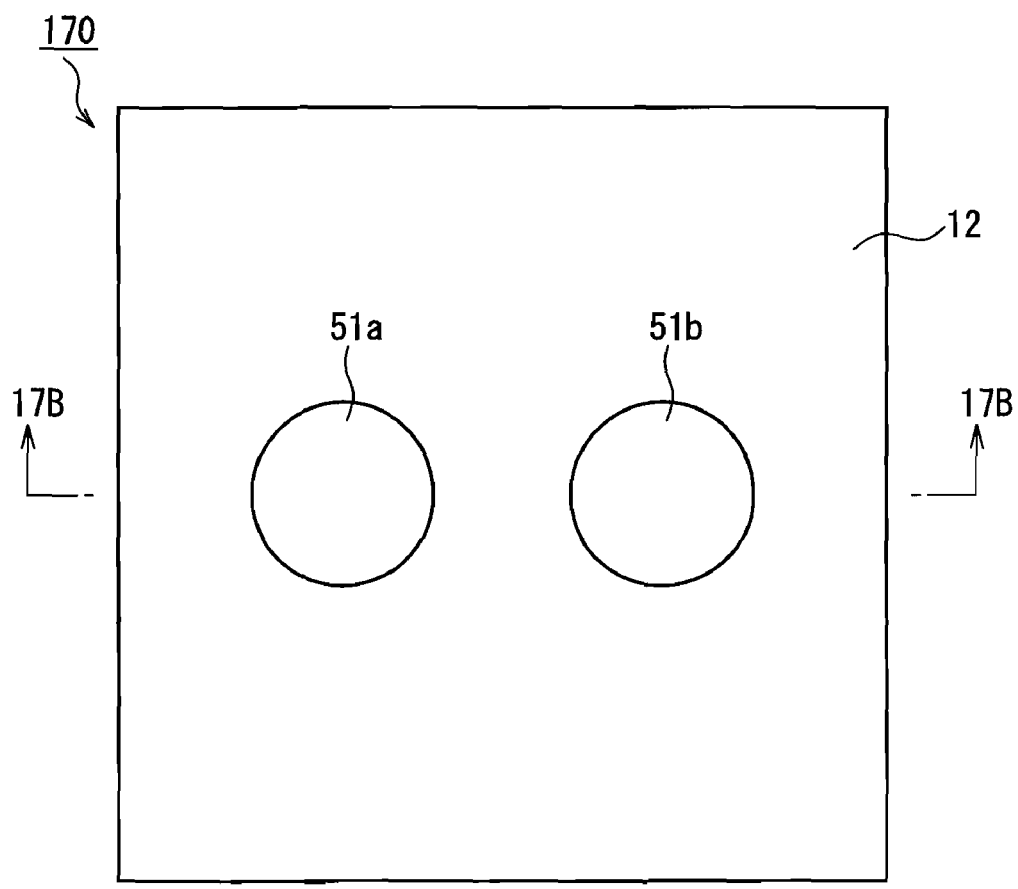
FIG. 17A is a top view of a lens substrate according to Comparative Example 5.
Figure 17B:
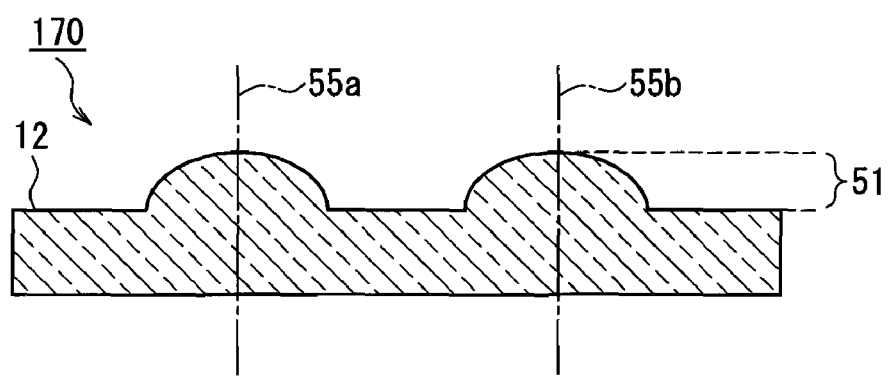
FIG. 17B is a sectional view taken along the line 17B-17B in FIG. 17A.

As Comparative Example 5, a compound-eye lens substrate 170 as shown in FIGS. 17A and 17B that was the same as the lens substrate 50 in Example 5 except that the third regions 13 were not provided was prepared. The thickness between the bottom of the lens substrate 170 and the apex of each of the first regions 51a and 51b was set to 0.8 mm, the thickness between the bottom and the upper surface of the second region 12 was set to 0.6 mm, and other sizes and the material were set completely the same as those in Example 5. By forming protection films on the lens substrate 170 using the same coating and the same method as those in Example 5, a lens having a protection film was obtained.

Figure 18:
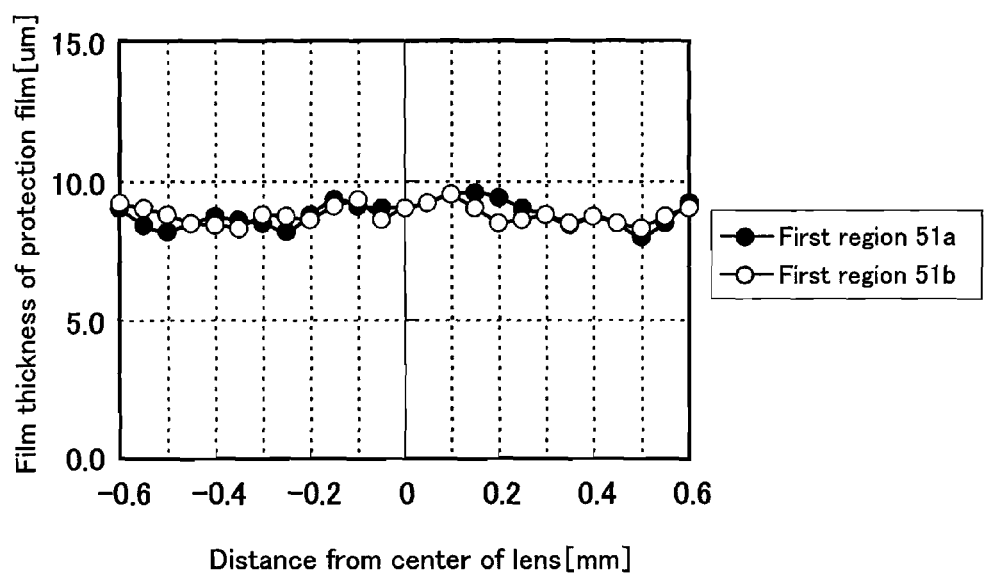
FIG. 18 is a graph showing a result of measuring the film thickness of protection films in Example 5.

The film thickness of the protection films formed on the first regions 51a and 51b of the respective lenses having a protection film obtained in Example 5 and Comparative Example 5 was measured using the method described with reference to FIG. 9. The measurement was carried out along a cross section including the central axis 55a of the first region 51a and a cross section including the central axis 55b of the first region 51b. FIG. 18 shows the measurement result in Example 5 and FIG. 19 shows the measurement result in Comparative Example 5.

Figure 19:
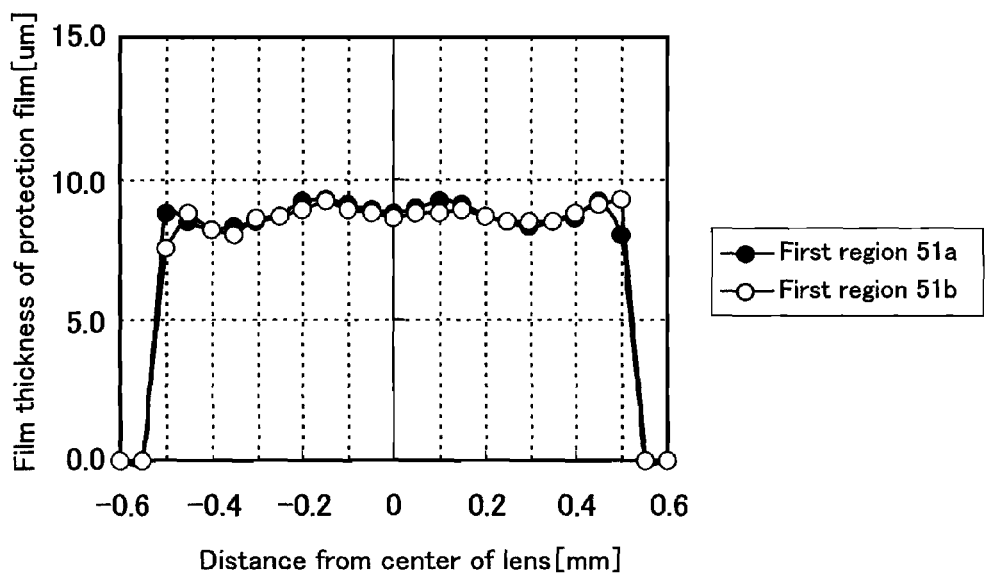
FIG. 19 is a graph showing a result of measuring the film thickness of protection films in Comparative Example 5.

As can be seen from FIG. 19, in Comparative Example 5 where the third regions 13 were not formed, it was confirmed that there were areas on the rim of each of the first regions 51a and 51b where the protection film was not formed. In contrast, as can be seen from FIG. 18, in Example 5 where the third regions 13 were formed, it was confirmed that there was almost no variation in the film thickness throughout the center portion to the rim of each of the first regions 51a and 51b, and the protection film was formed throughout each of the first regions 51a and 51b in a substantially uniform manner. In other words, it was confirmed that the protection films having a surface shape that substantially matched the aspherical shape of each of the first regions 51a and 51b were formed.

Example 6

As Example 6, a compound-eye lens substrate 60 as shown in FIGS. 6A and 6B was prepared using polycarbonate (manufactured by Teijin Chemicals Ltd., AD-5503, d-line refractive index: 1.59, Abbe's number: 28) as its material. Two first regions 61a and 61b each having a lens function were disposed on one surface of the lens substrate 60. The lens substrate 60 in Example 6 was the same as the lens substrate 30 in Example 3 except that the number of the lenses was two. The lens substrate 60 included the two first regions 61a and 61b each having a blazed grating curved surface, the second region 12 formed around the first regions 61a and 61b and composed of a plane, and the third regions 13 respectively provided between the first regions 61a and 61b and the second region 12. The shape of the lens substrate 60 in a plan view was a square of 5 mm×5 mm, the shape of each of the two first regions 61a and 61b disposed in the vicinity of the center of the lens substrate 60 was, in a plan view, a circle with a diameter of 1.2 mm. The thickness between the bottom of the lens substrate 60 and the apex of each of the first regions 61a and 61b was set to 0.8 mm, the thickness between the bottom and the upper surface of the second region 12 was set to 0.5 mm, and each of the third regions 31 was formed in a cylindrical shape with a diameter of 1.2 mm and a thickness of 0.1 mm. The distance between the central axis 65a of the first region 61a and the central axis 65b of the first region 61b was set to 2.2 mm.

By forming protection films on the first regions 61a and 61b using the same coating and the same method as those in Example 3, a lens having a protection film was obtained.

Comparative Example 6

Figure 20A:
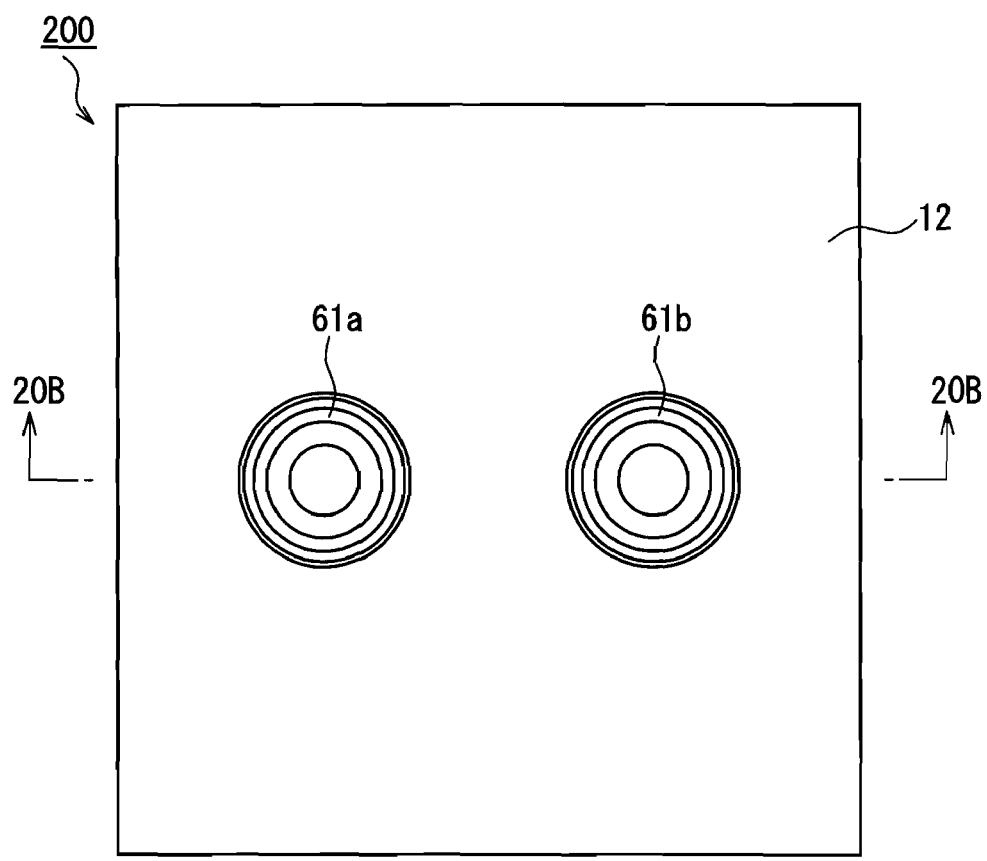
FIG. 20A is a top view of a lens substrate according to Comparative Example 6.
Figure 20B:
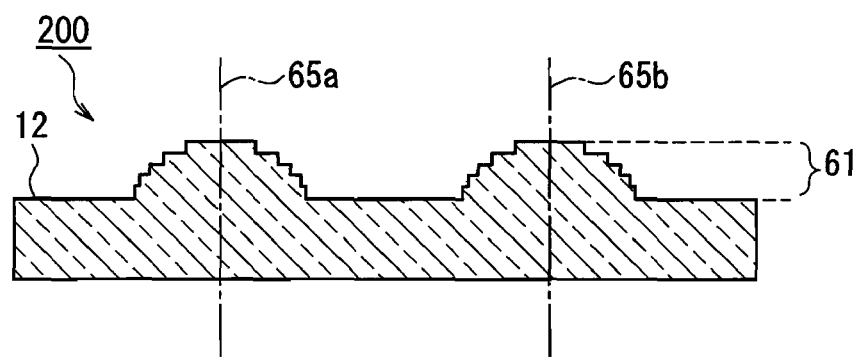
FIG. 20B is a sectional view taken along the line 20B-20B in FIG. 20A.

As Comparative Example 6, a compound-eye lens substrate 200 as shown in FIGS. 20A and 20B that was the same as the lens substrate 60 in Example 6 except that the third regions 13 were not provided was prepared. The thickness between the bottom of the lens substrate 200 and the apex of each of the first regions 61a and 61b was set to 0.8 mm, the thickness between the bottom and the upper surface of the second region 12 was set to 0.6 mm, and other sizes and the material were set completely the same as those in Example 6. By forming protection films on the lens substrate 200 using the same coating and the same method as those in Example 6, a lens having a protection film was obtained.

Figure 21:
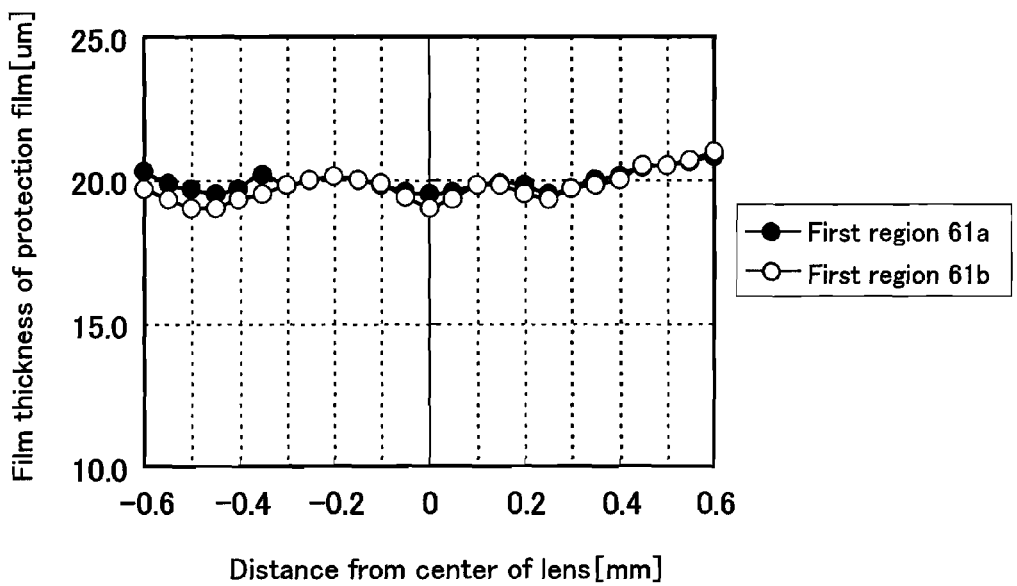
FIG. 21 is a graph showing a result of measuring the film thickness of protection films in Example 6.

The film thickness of the protection films on the first regions 61a and 61b of the respective lenses having a protection film obtained in Example 6 and Comparative Example 6 was measured using the method described with reference to FIG. 14. The measurement was carried out along a cross section including the central axis 65a of the first region 61a and a cross section including the central axis 65b of the first region 61b. FIG. 21 shows the measurement result of Example 6 and FIG. 22 shows the measurement result of Comparative Example 6.

Figure 22:
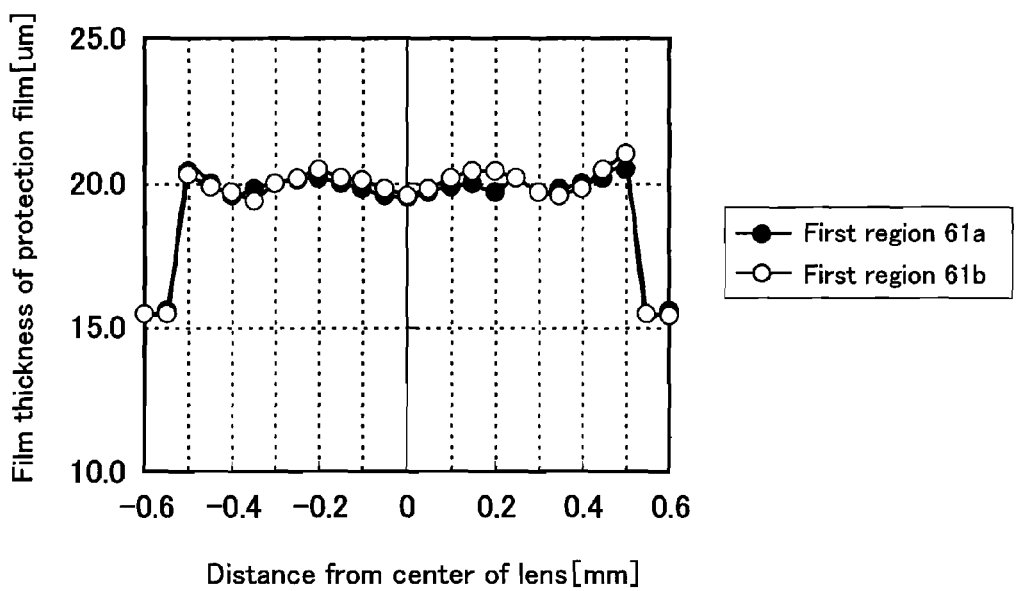
FIG. 22 is a graph showing a result of measuring the film thickness of protection films in Comparative Example 6.

As can be seen from FIG. 22, in Comparative Example 6 where the third regions 13 were not formed, it was confirmed that, similarly to Comparative Example 5, there were areas on the rim of each of the first regions 61a and 61b where the protection film was not formed. In contrast, as can be seen from FIG. 21, in Example 6 where the third regions 13 were formed, it was confirmed that, similarly to Example 5, there was almost no variation in the film thickness throughout the center portion to the rim of each of the first regions 61a and 61b, and the protection film was formed throughout each of the first regions 61a and 61b in a substantially uniform manner. In other words, it was confirmed that the protection films having a surface shape that substantially matched the aspherical shape of the diffraction grating curved surface of the first regions 61a and 61b were formed.

Example 7

As Example 7, a lens substrate 30 as shown in FIGS. 3A and 3B that was the same as the substrate used in Example 3 was prepared. A coating for the protection film had the same composition as that used in Example 3 but it was prepared to have a viscosity of 10 Pa·s by adjusting the amount of the solvent. Next, the coating was screen-printed on the first region 31 using a screen plate made of Tetron (registered trademark) having an emulsion thickness of 20 μm. Then, after vaporizing the solvent in the coating by carrying out decompression for 10 minutes at ambient temperature, UV irradiation was carried out to cure the coating. The screen printing, the vaporization, and the UV irradiation were repeated twice, and thereby a lens having a protection film was obtained.

Comparative Example 7

As Comparative Example 7, a lens substrate 120 as shown in FIGS. 12A and 12B that was the same as the lens substrate 30 in Example 7 except that the third region 13 was not provided was prepared. The thickness between the bottom of the lens substrate 120 and the apex of the first region 31 was set to 0.8 mm, the thickness between the bottom and the upper surface of the second region 12 was set to 0.6 mm, and other sizes and the material were set completely the same as those in Example 7. By forming a protection film on the lens substrate 120 using the same coating and the same method as those in Example 7, a lens having a protection film was obtained.

Figure 23:
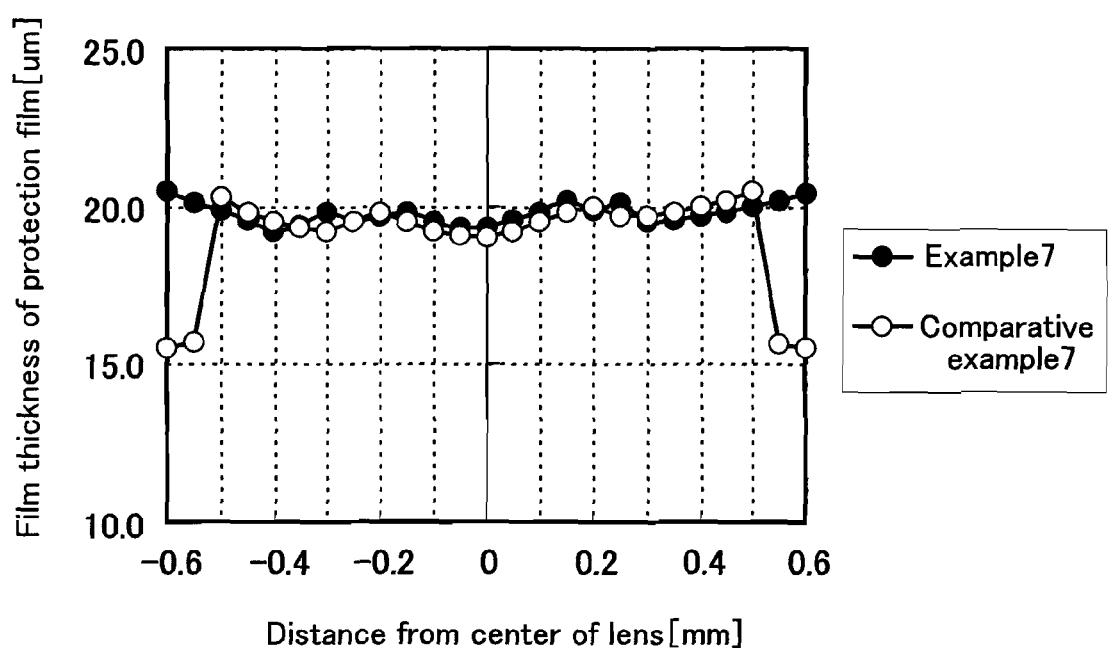
FIG. 23 is a graph showing a result of measuring the film thickness of protection films in Example 7 and Comparative Example 7.
Figure 24A:
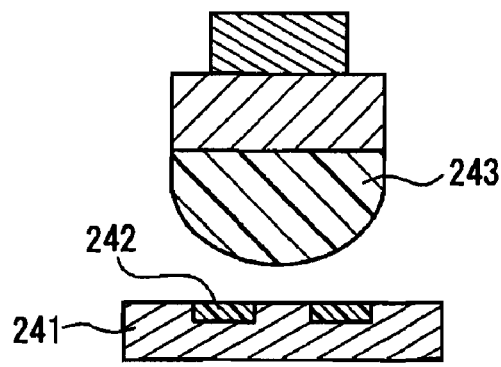
FIG. 24A is a cross-sectional view showing a step of conventional pad printing.
Figure 24B:
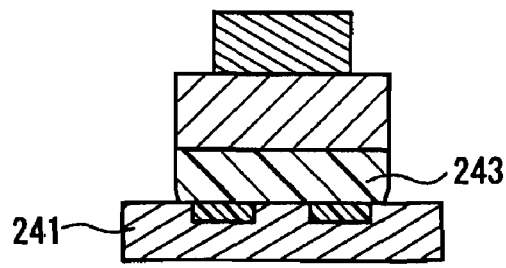
FIG. 24B is a cross-sectional view showing a step of the conventional pad printing.
Figure 24C:
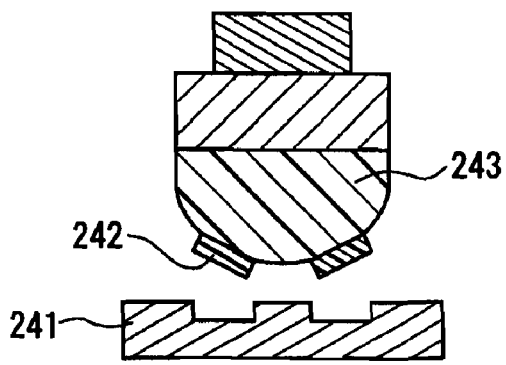
FIG. 24C is a cross-sectional view showing a step of the conventional pad printing.
Figure 24D:
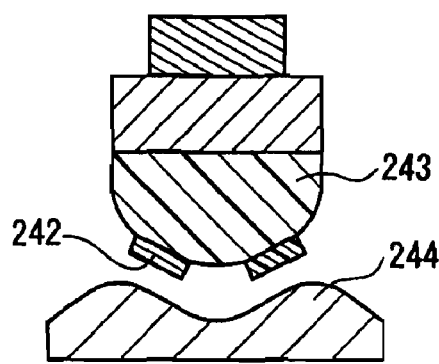
FIG. 24D is a cross-sectional view showing a step of the conventional pad printing.
Figure 24E:
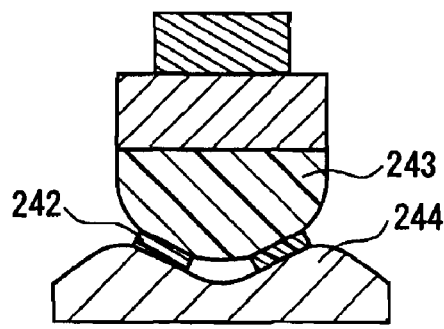
FIG. 24E is a cross-sectional view showing a step of the conventional pad printing.
Figure 24F:
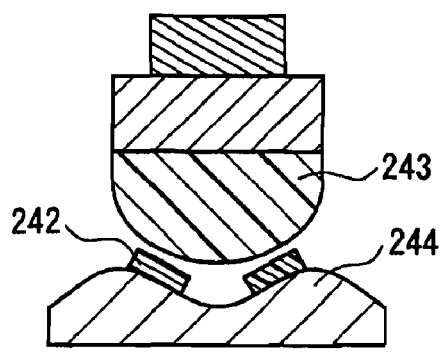
FIG. 24F is a cross-sectional view showing a step of the conventional pad printing.

The film thickness of the protection films on the first regions 31 of the lenses having a protection film obtained in Example 7 and Comparative Example 7 was measured using the method described with reference to FIG. 14. FIG. 23 shows the results.

As can be seen from FIG. 23, in Comparative Example 7 where the third region 13 was not formed, it was confirmed that, similarly to the case of forming a protection film using pad printing, there were areas on the rim of the first region 31 where the protection film was not formed. In contrast, in Example 7 where the third region 13 was formed, it was confirmed that there was almost no variation in the film thickness throughout the center portion to the rim of the first region 31, and the protection film was formed throughout the first region 31 in a substantially uniform manner. In other words, it was confirmed that the protection film having a surface shape that substantially matched the aspherical shape of the diffraction grating curved surface of the first region 31 was formed.

In Examples 1 to 8, although the coatings used to form the protection films contained a solvent, they do not have to contain a solvent when the viscosity is appropriate for a technique to be used. Even in that case, the effects similar to the above can be achieved.

Each of the above-described embodiments and examples is intended merely to clarify the technical content of the present invention. The present invention is not to be construed as limited to these specific examples, but to be construed in a broad sense, and may be practiced with various modifications within the spirit and the scope of the claims.

Industrial Applicability

Although the lens having a protection according to the present invention can be utilized in any fields without particular limitation, it can be used as, for example, a lens for a mobile phone camera module or an in-car camera module.

The invention claimed is:

1. A method for manufacturing a lens having a protection film comprising the steps of:
forming a protection film on a first surface of a lens substrate,
the lens substrate including, at least on one side, the first surface having a curved shape to provide a lens function, a second surface formed around the first surface and composed of a single continuous plane, and a third surface disposed between the first surface and the second surface adjacently to the first surface and the second surface,
wherein the first surface is protruded relative to the second surface,
the third surface is perpendicular to the second surface, and the protection film is formed on the first surface,
wherein in the step of forming the protection film, a coating for forming the protection film is applied to the first surface using pad printing.

2. A method for manufacturing a lens having a protection film comprising the steps of:
forming a protection film on a first surface of a lens substrate,
the lens substrate including, at least on one side, the first surface having a curved shape to provide a lens function, a second surface formed around the first surface and composed of a single continuous plane, and a third surface disposed between the first surface and the second surface adjacently to the first surface and the second surface,
wherein the first surface is protruded relative to the second surface,
the third surface is perpendicular to the second surface, and the protection film is formed on the first surface,
wherein in the step of forming the protection film, a coating for forming the protection film is applied to the first surface using screen printing.

3. A lens having a protection film comprising:
a lens substrate including, at least on one side, a first surface having a curved shape to provide a lens function, a second surface formed around the first surface and composed of a single continuous plane, and a third surface disposed between the first surface and the second surface adjacently to the first surface and the second surface; and a protection film formed on the first surface,
wherein the first surface is protruded relative to the second surface,
the third surface is formed throughout a rim of the first surface, and
the third surface is perpendicular to the second surface.

4. The lens having a protection film according to claim 3, wherein a diffraction grating is formed on the surface of the first surface.

5. The lens having a protection film according to claim 3, wherein the lens substrate includes a plurality of the first surfaces.

6. The lens having a protection film according to claim 3, wherein a recessed amount of the third surface is one tenth or more of a diameter of the rim of the first surface.

7. The lens having a protection film according to claim 3, wherein a diameter of a rim of the third surface is equal to or less than a diameter of the rim of the first surface.

* * * * *